(12) United States Patent
Tanimoto et al.

(10) Patent No.: US 6,710,793 B1
(45) Date of Patent: Mar. 23, 2004

(54) LIGHT BEAM SCANNING APPARATUS AND IMAGE FORMING APPARATUS

(75) Inventors: Koji Tanimoto, Tagata-gun (JP); Kenichi Komiya, Kawasaki (JP); Daisuke Ishikawa, Sunto-gun (JP); Koji Kawai, Tagata-gun (JP); Jun Sakakibara, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/305,165

(22) Filed: Nov. 27, 2002

(51) Int. Cl.[7] ............................... B41J 2/435; B41J 2/47
(52) U.S. Cl. ..................... 347/235; 347/249; 347/250
(58) Field of Search ......................... 347/235, 234, 347/249, 250, 248

(56) References Cited

U.S. PATENT DOCUMENTS

| | | |
|---|---|---|
| 5,576,852 A | 11/1996 | Sawada et al. |
| 5,995,246 A | 11/1999 | Komiya et al. |
| 6,208,367 B1 | 3/2001 | Tanimoto et al. |
| 6,469,730 B2 * | 10/2002 | Tanimoto et al. ............ 347/249 |
| 6,498,617 B1 * | 12/2002 | Fisher et al. ................. 347/252 |

FOREIGN PATENT DOCUMENTS

JP          353122329 A   * 10/1978 ................. 347/248

* cited by examiner

*Primary Examiner*—Thinh Nguyen
(74) *Attorney, Agent, or Firm*—Foley & Lardner

(57) ABSTRACT

In an image forming apparatus such as a digital copying machine using a multi-beam optical system, a printing area can be set in the unit equal to or smaller than a clock for image formation by use of a delay pulse for each light beam and the exposure position in the light beam scanning direction (main scanning direction) is always precisely controlled by selecting an optimum set value while the actual light beam position is being checked by use of a sensor.

19 Claims, 23 Drawing Sheets

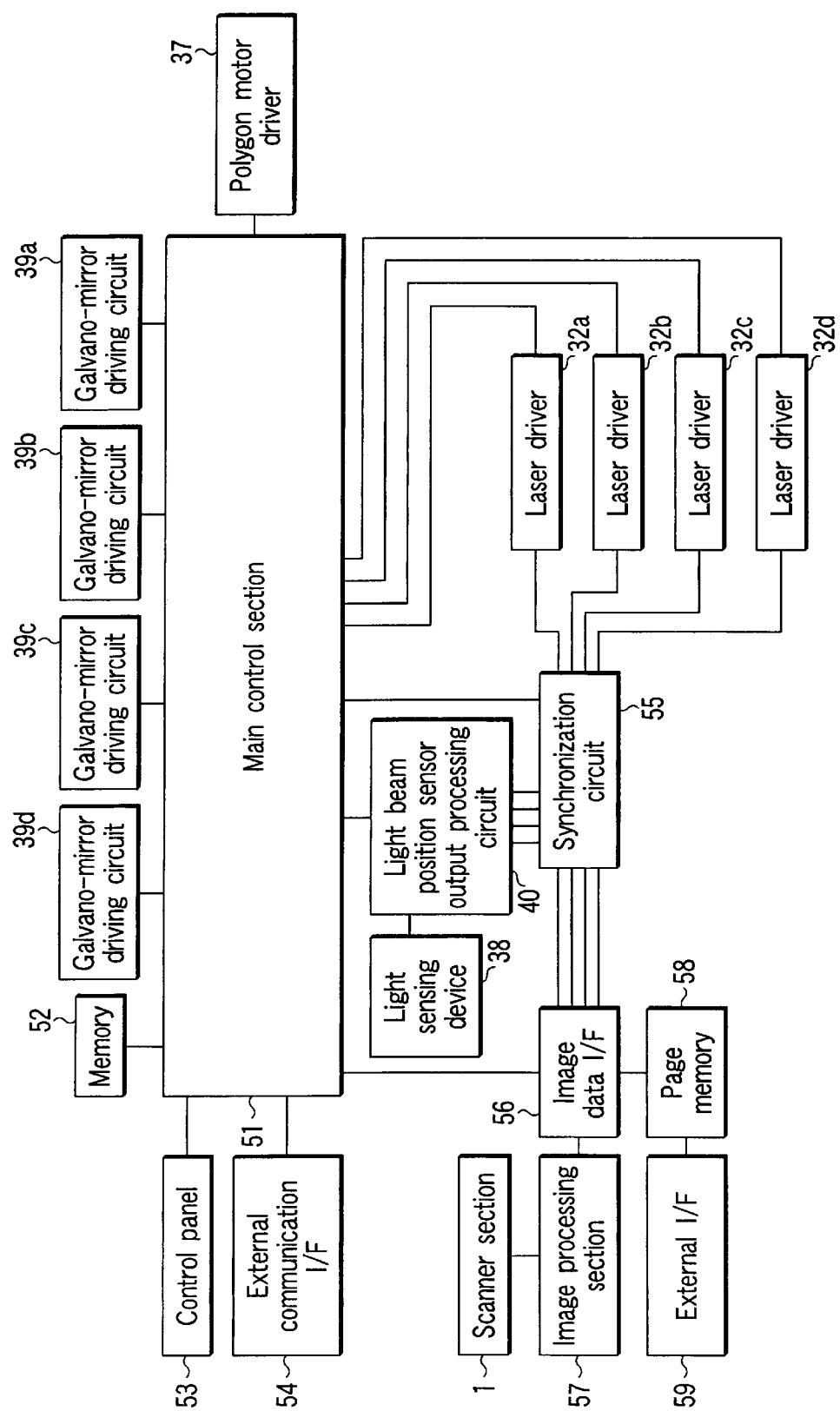
F I G. 5

|  | Printing area | Delay pulse |
|---|---|---|
|  | Start to end |  |
| Light beam "a" | 5 to 9 | D5 |
| Light beam "b" | 12 to 16 | D8 |
| Light beam "c" | 18 to 22 | D2 |
| Light beam "d" | 20 to 24 | D7 |

FIG. 19

|  | Setting of printing area |
|---|---|
|  | Start to end |
| Light beam "a" | 109 to 7124 |
| Light beam "b" | 116 to 7131 |
| Light beam "c" | 122 to 7137 |
| Light beam "d" | 124 to 7139 |

FIG. 20

LIGHT BEAM SCANNING APPARATUS AND IMAGE FORMING APPARATUS

BACKGROUND OF THE INVENTION

This invention relates to a light beam scanning apparatus which simultaneously scans and exposes a single photosensitive drum by use of, for example, a plurality of laser beams to form a single electrostatic latent image on the photosensitive drum and an image forming apparatus such as a digital copying machine and laser printer using the same.

Recently, in order to enhance the image forming speed, a digital copying machine of a multi-beam system, that is, a system which emits a plurality of laser beams and simultaneously scans the plurality of laser beams to draw a plurality of lines has been developed.

The above digital copying machine of the multi-beam system includes a plurality of semiconductor laser oscillators which emit laser beams, a polygon rotating mirror which reflects the laser beams emitted from the plurality of semiconductor laser oscillators to the photosensitive drum to scan the laser beams on the photosensitive drum, and an optical system unit used as a scanning apparatus and mainly configured by a collimator lens and f-θ lens and the like.

As the scanning apparatus, there is provided an apparatus which delays the sync clock by a constant period of time by use of a delay line to control the exposure position in the scanning direction (main scanning direction) of the light beam (U.S. Pat. No. 6,208,367).

In the above invention, the sync clock is delayed by a constant period of time by use of the delay line, but in this case, there is a possibility that the duty ratio will vary and there occurs a problem that the reliability is lowered.

BRIEF SUMMARY OF THE INVENTION

An object of this invention is to provided a light beam scanning apparatus and image forming apparatus which enhance the reliability and can always precisely control the exposure position in the scanning direction (main scanning direction) of the light beam.

In order to attain the above object, a light beam scanning apparatus according to an aspect of the present invention comprises light emitting means for emitting a light beam, scanning means for reflecting the light beam emitted from the light emitting means to a to-be-scanned surface to scan the to-be-scanned surface by use of the light beam, light sensing means arranged on the to-be-scanned surface or in an equivalent position thereof, for sensing the light beam which is used to scan the to-be-scanned surface by the scanning means, sync signal output means for delaying an output of the light sensing means by a delay amount which is controllable, image forming range setting means for setting an image forming range of the light beam while the sync signal output from the sync signal output means is used as a reference, and control means for controlling the sync signal output means and image forming range setting means to set the image forming range of the light beam to a preset position.

Further, an image forming apparatus according to another aspect of the present invention which is an image forming apparatus which scans and exposes an image carrying body by use of a light beam to form an image on the image carrying body comprises light emitting means for emitting a light beam, scanning means for reflecting the light beam emitted from the light emitting means to the image carrying body to scan the image carrying body by use of the light beam, light sensing means arranged on the image carrying body or in an equivalent position thereof, for sensing the light beam which is used to scan the image carrying body by the scanning means, sync signal output means for delaying an output of the light sensing means by a delay amount which is controllable, image forming range setting means for setting an image forming range of the light beam while the sync signal output from the sync signal output means is used as a reference, and control means for controlling the sync signal output means and image forming range setting means to set the image forming range of the light beam to a preset position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram showing a control system with attention mainly paid to the control section of the optical system, FIG. 19 is a diagram showing an example of information of the light beam position in the main scanning direction for respective light beams "a" to "d", FIG. 20 is a diagram showing a setting example of printing areas for the light beams "a" to "d"

DETAILED DESCRIPTION OF THE INVENTION

There will now be described an embodiment of this invention with reference to the accompanying drawings.

Figure 1:
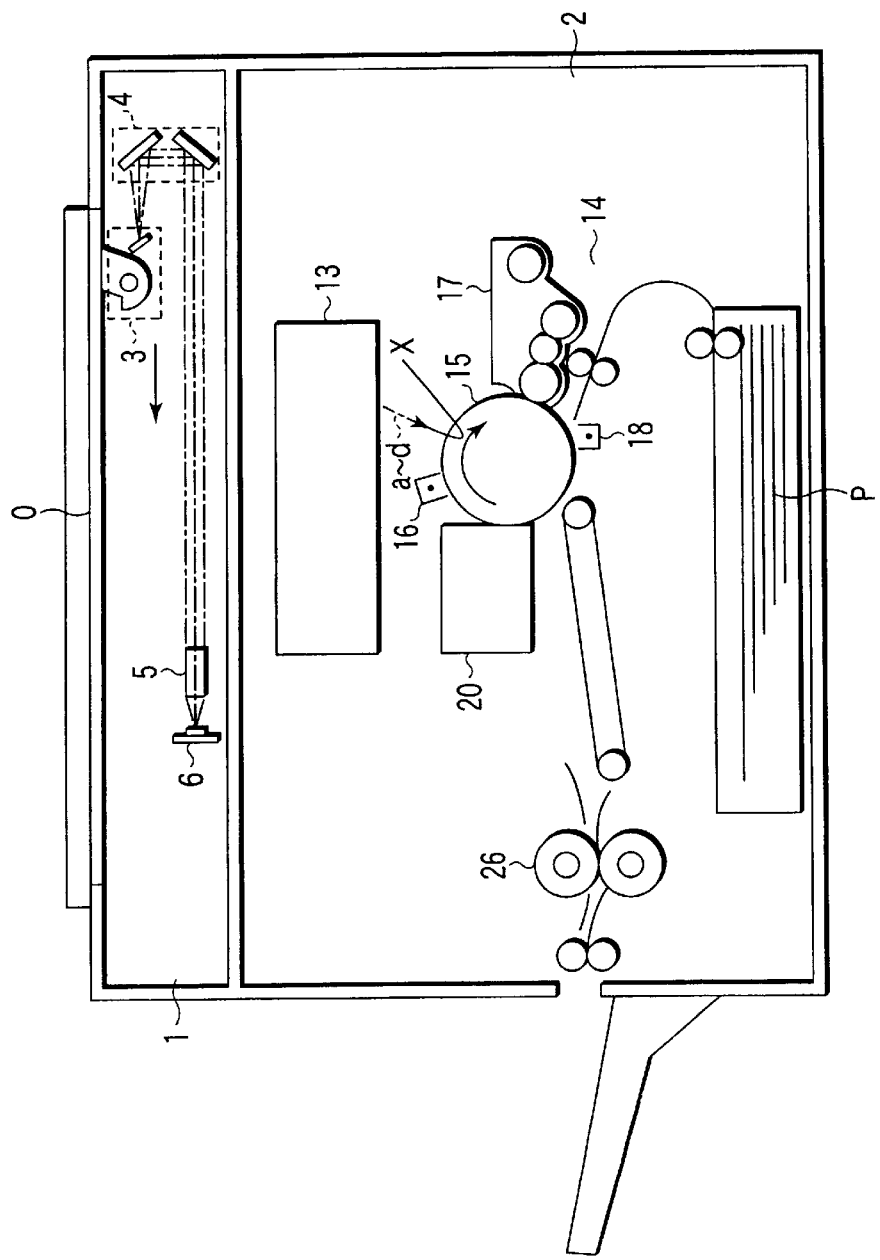
FIG. 1 is a configuration view schematically showing the configuration of a digital copying machine according to an embodiment of this invention.

FIG. 1 shows the configuration of a digital copying machine as an image forming apparatus to which a light beam scanning apparatus according to an embodiment of this invention is applied. The digital copying machine includes a scanner section 1 used as image reading means, and a printer section 2 used as image forming means, for example. The scanner section 1 includes a first carriage 3 and second carriage 4 which can be moved in a direction indicated by an arrow in the drawing, image forming lens 5 and photoelectric converting element 6.

In FIG. 1, the first carriage 3 and second carriage 4 are moved in a direction from right to left in synchronism with a reading timing signal by use of a carriage driving motor (not shown). Further, information of an original O is focused on the light receiving surface of the photoelectric converting element 6 via the image forming lens 5.

An image of the original O set on an original table is sequentially read for each line by the scanner section 1.

The printer section 2 includes an optical system unit 13 and an electrophotographic image forming section 14. That is, an image signal read from the original O by the scanner section 1 is processed by an image processor (not shown) and then converted into a laser beam (which is hereinafter simply referred to as a light beam) from a semiconductor laser oscillator. In the present embodiment, a multi-beam optical system using a plurality of semiconductor laser oscillators is used.

The plurality of semiconductor laser oscillators provided in the optical system unit 13 emit light beams according to a laser modulation signal output from the image processor (not shown) and the plurality of light beams output from the semiconductor laser oscillators are reflected by a polygon mirror and used as scanning beams, and then output to the exterior of the unit. This will be described in detail later.

An electrostatic latent image corresponding to an image signal is formed on a photosensitive drum 15 by the plurality of light beams output from the optical system unit 13.

Around the photosensitive drum 15, an electric charger 16 which charges the surface thereof, developing unit 17, transfer charger 18, cleaner 20 and the like are arranged.

The electrostatic latent image formed on the photosensitive drum 15 is developed by toner from the developing unit 17. The photosensitive drum 15 having a toner image formed by developing transfers the toner image onto paper P supplied by use of the transfer charger 18.

The paper P having the toner image transferred thereto is fed to a fixing unit 26 which in turn fixes the toner image on the paper and is then discharged to an external paper discharging tray 28.

Further, remaining toner on the surface of the photosensitive drum 15 after the toner image has been transferred onto the paper P is removed by the cleaner 20, then the photosensitive drum 15 is returned to the initial state and set into a standby state for next image formation.

The image forming operation is continuously performed by repeatedly performing the above processing operation.

Next, the optical system unit 13 is explained.

Figure 2:
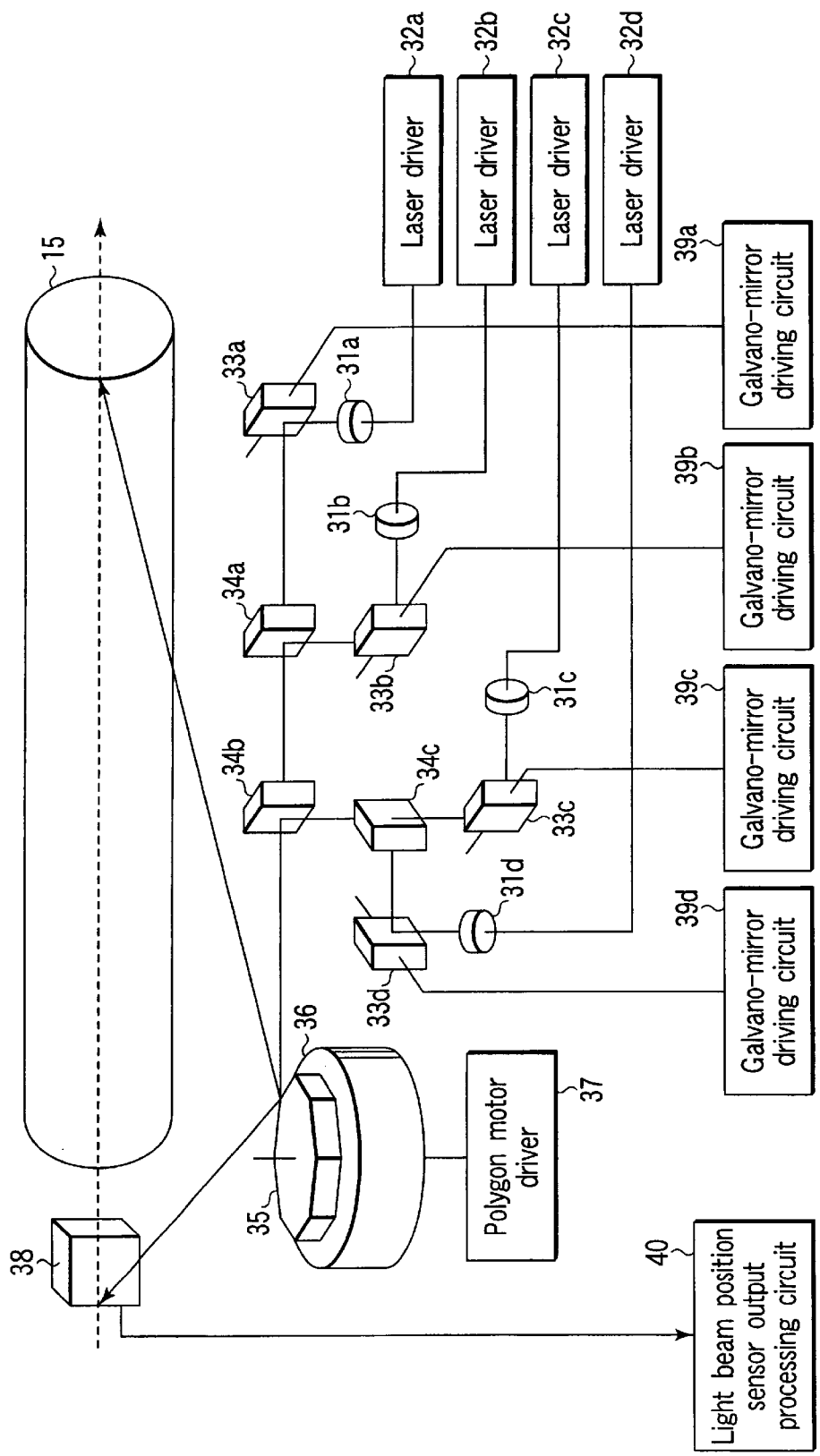
FIG. 2 is a view showing the configuration of an optical system unit and the positional relation thereof with respect to a photosensitive drum.

FIG. 2 shows the configuration of the optical system unit 13 and the positional relation thereof with respect to the photosensitive drum 15. For example, the optical system unit 13 contains semiconductor laser oscillators 31a, 31b, 31c, 31d used as four light emitting means. The high-speed image forming operation can be attained by causing the semiconductor laser oscillators 31a to 31d to simultaneously perform the image forming processes of each scanning line without extremely raising the rotating speed of the polygon mirror.

That is, the laser oscillator 31a is driven by a laser driver 32a and the light beam emitted therefrom is made incident on a galvano-mirror 33a used as an optical path changing means after passing through a collimator lens (not shown). The light beam reflected by the galvano-mirror 33a passes through half-mirrors 34a, 34b and is made incident on a polygon mirror 35 used as a polygon rotating mirror.

The polygon mirror 35 is rotated at constant speed by a polygon motor driven by a polygon motor driver 37. Therefore, light reflected from the polygon mirror 35 scans in a preset direction at an angular velocity determined by the rotating speed of the polygon motor 36. The light beam scanned by the polygon mirror 35 passes through an f-θ lens (not shown) and scans the photosensitive drum 15 and the light receiving surface of the light sensing device 38 used as light beam position sensing means and light beam passage detecting means at constant speed according to the f-θ characteristic of the f-θ lens.

The laser oscillator 31b is driven by a laser driver 32b and the light beam emitted therefrom passes through a collimator lens (not shown) and is then reflected from a galvano-mirror 33b and further reflected from the half-mirror 34a. Light reflected from the half-mirror 34a passes through the half-mirror 34b and is made incident on the polygon mirror 35. The path along which light is transmitted after reflection from the polygon mirror 35 is the same as that in the case of the laser oscillator 31a. That is, light passes through the f-θ lens (not shown) and scans the photosensitive drum 15 and the light receiving surface of the light sensing device 38 at constant speed.

The laser oscillator 31c is driven by a laser driver 32c and the light beam emitted therefrom is reflected from a galvano-mirror 33c after passing through a collimator lens (not shown), passes through a half-mirror 34c, is reflected from the half-mirror 34b and is made incident on the polygon mirror 35. The path along which light is transmitted after reflection from the polygon mirror 35 is the same as that in the case of the laser oscillators 31a, 31b. That is, light passes through the f-θ lens (not shown) and scans the photosensitive drum 15 and the light receiving surface of the light sensing device 38 at constant speed.

The laser oscillator 31d is driven by a laser driver 32d and the light beam emitted therefrom is reflected from a galvano-mirror 33d after passing through a collimator lens (not shown), then is sequentially reflected by the half-mirrors 34c, 34b and made incident on the polygon mirror 35. The path along which light is transmitted after reflection from the polygon mirror 35 is the same as that in the case of the laser oscillators 31a, 31b, 31c. That is, light passes through the f-θ lens (not shown) and scans the photosensitive drum 15 and the light receiving surface of the light sensing device 38 at constant speed.

The laser drivers 32a to 32d each contain an automatic power control (APC) circuit and cause the laser oscillators 31a to 31d to always emit light at light emission power levels set by a main control section (CPU) 51 which will be described later.

As described above, the light beams emitted from the different laser oscillators 31a to 31d are synthesized by the half-mirrors 34a, 34b, 34c and thus the four light beams travel in a direction towards the polygon mirror 35.

Therefore, the four light beams can simultaneously scan the photosensitive drum 15.

The galvano-mirrors 33a, 33b, 33c, 33d are used to adjust (control) the positional relation between the light beams in the sub-scanning direction and are connected to galvano-mirror driving circuits 39a, 39b, 39c, 39d which respectively drive the galvano-mirrors.

The light sensing device 38 is used to detect the passage positions, passage timings and power levels of the four light beams and is disposed near the end portion of the photosensitive drum 15 so that the light receiving surface thereof is set on the same plane as the surface of the photosensitive drum 15. The operations of controlling the galvano-mirrors 33a, 33b, 33c, 33d for the respective light beams (controlling the image forming positions in the sub-scanning direction), controlling the light emission powers (intensities) of the laser oscillators 31a, 31b, 31c, 31d and controlling the light emission timings (controlling the image forming positions in the main scanning direction) are performed based on detection signals from the light sensing device 38 (the control operations are explained in detail later). A light sensing device output processing circuit 40 is connected to the light sensing device 38 to generate signals used to perform the above controlling operations.

Next, the light sensing device 38 is explained.

Figure 3:
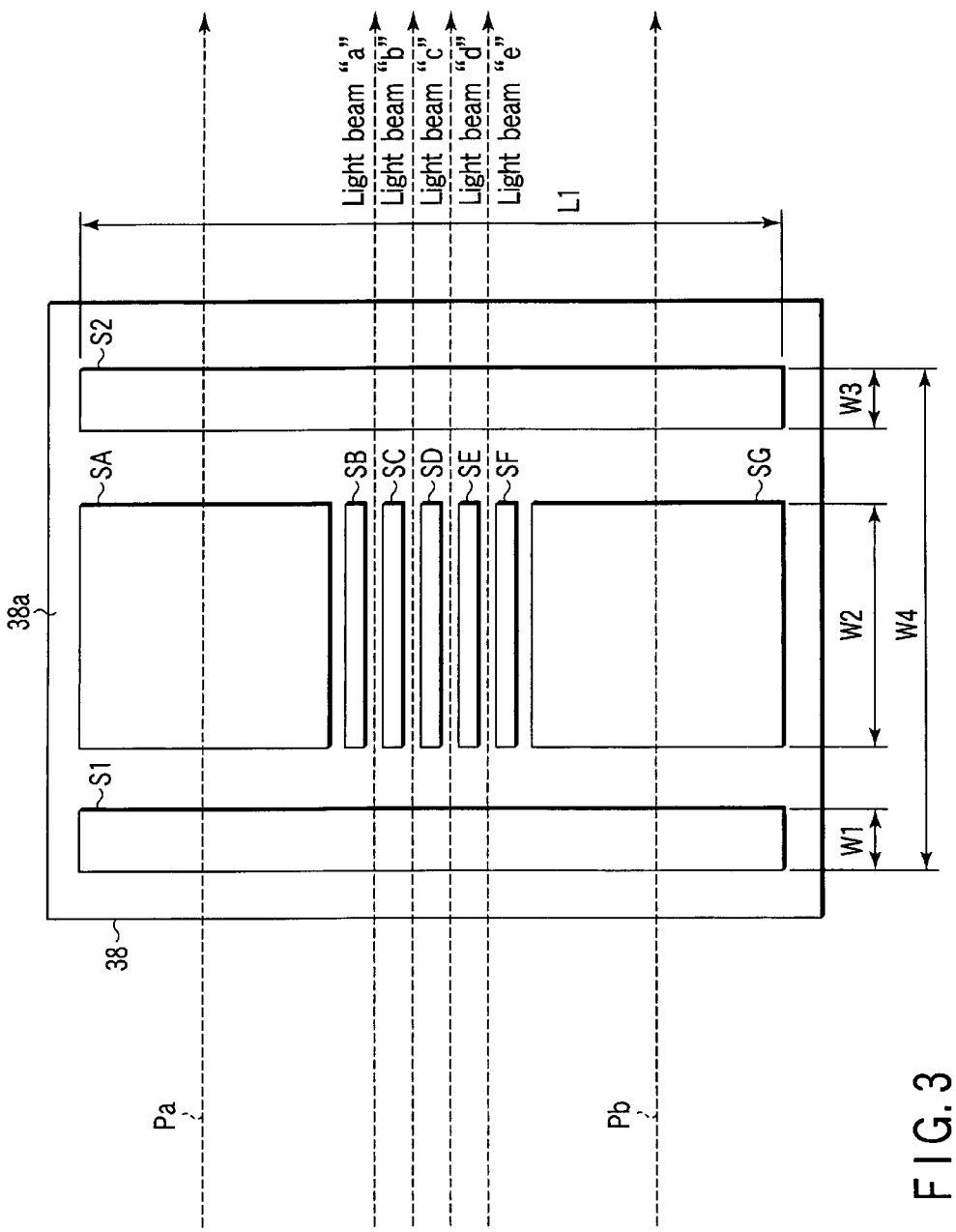
FIG. 3 is a configuration view schematically showing the configuration of a light sensing device.

FIG. 3 schematically shows the relation between the scanning direction of light beams and the configuration of the light sensing device 38. Light beams "a" to "d" from the four semiconductor laser oscillators 31a, 31b, 31c, 31d are scanned from the left to the right by rotation of the polygon mirror 35 to pass across the light sensing device 38.

The light sensing device 38 includes two sensor patterns S1, S2 which are long in the vertical direction and used as a first light sensing section, seven sensor patterns SA, SB, SC, SD, SE, SF, SG arranged between the two sensor patterns S1 and S2 and used as second and third light sensing sections, and a holding base plate 38a used as a holding member to integrally support the sensor patterns S1, S2, SA, SB, SC, SD, SE, SF, SG. For example, the sensor patterns S1, S2, SA to SG are each configured by a photodiode.

In this example, the sensor pattern S1 is a pattern which detects passage of a light beam and generates a reset signal (integral operation starting signal) of an integrator which will be described later. Likewise, the sensor pattern S2 is a pattern which detects passage of a light beam and generates a conversion starting signal of an analog-to-digital converter which will be described later. Further, as will be described in detail later, the sensor patterns S1, S2 are reference patterns used to perform various control operations in the main scanning direction. The sensor patterns SA to SG are patterns used to detect the passage position of the light beam.

As shown in FIG. 3, the sensor patterns S1, S2 are formed to be long in a direction perpendicular to the scanning direction of the light beam so that the light beams "a" to "d" scanned by the polygon mirror 35 will cross the patterns without fail irrespective of the positions of the galvano-mirrors 33a to 33d. For example, in this example, the widths W1, W3 of the patterns in the scanning direction of the light beam are 200 μm and the length L1 thereof in the direction perpendicular to the scanning direction of the light beam is 2000 μm.

As shown in FIG. 3, the sensor patterns SA to SG are arranged in a stacked form in the direction perpendicular to the scanning direction of the light beam between the sensor patterns S1 and S2 and the total length of the stacked form is set equal to the length L1 of the sensor patterns S1, S2. For example, the width W2 of the sensor patterns SA to SG in the scanning direction of the light beam is 600 μm.

In order to sense the power of a light beam on the photosensitive drum 15, for example, the passage position of the light beam is controlled so that the light beam will pass over the sensor pattern SA or SG as indicated by broken-line arrow Pa or Pb and an output from sensor pattern SA or SG is received.

Figure 4:
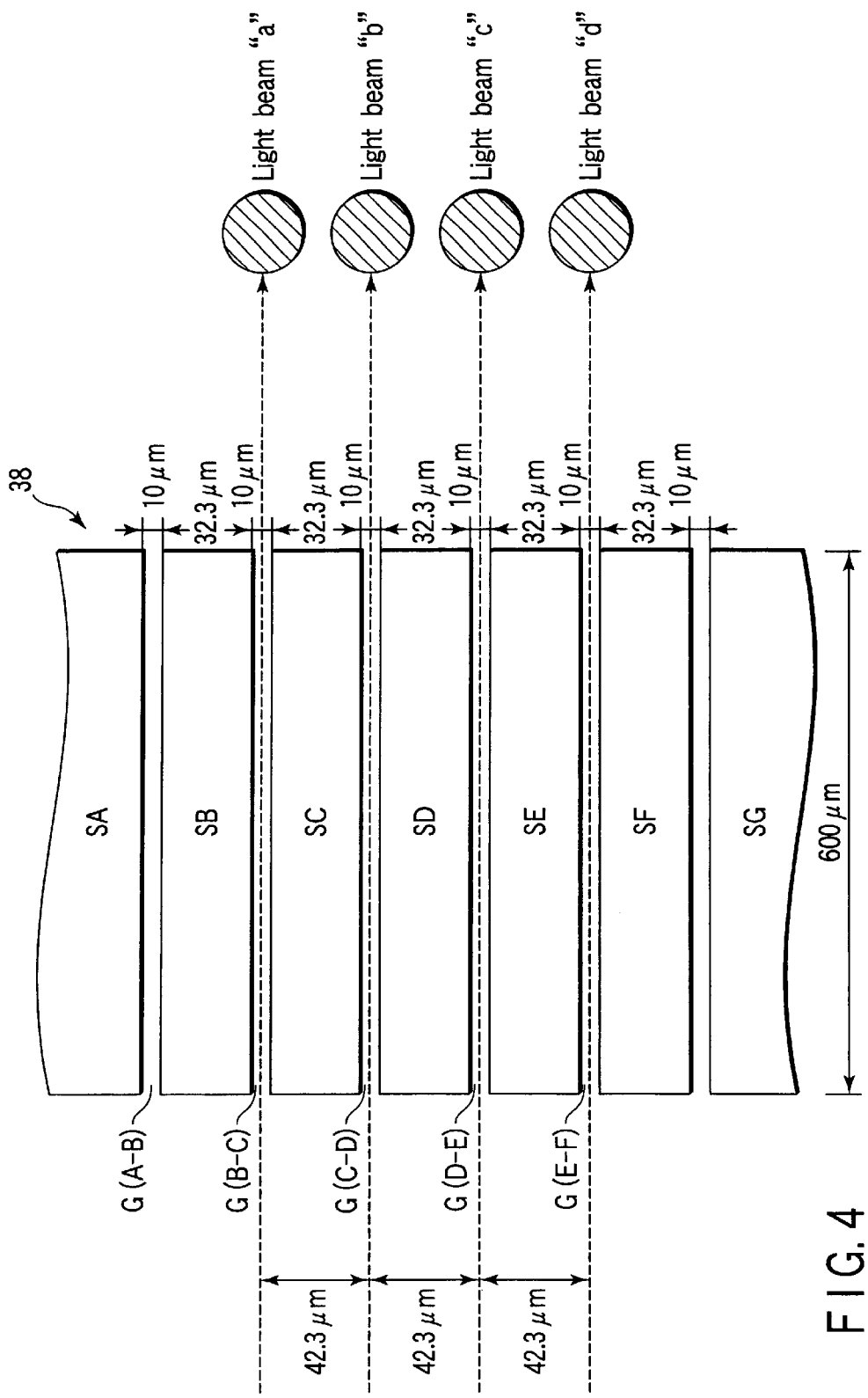
FIG. 4 is a configuration view schematically showing the configuration of a main portion of the light sensing device.

FIG. 4 shows the pattern shapes of the sensor patterns SA to SG of the light sensing device 38 in enlarged form.

The pattern shapes of the sensor patterns SB to SF are rectangles of 32.3 μm×600 μm, for example, and small gaps G of approximately 10 μm in the direction perpendicular to the scanning direction of the light beam are formed between them. Therefore, the layout pitch between the gaps is 42.3 μm. Further, gaps between the sensor patterns SA and SB and between the sensor patterns SF and SG are also set to approximately 10 μm. The widths of the sensor patterns SA, SG in the direction perpendicular to the scanning direction of the light beam are made larger than the widths of the sensor patterns SB to SF.

The control operation using the output of the light sensing device 38 with the above configuration will be described in detail later. The gaps formed at a pitch of 42.3 μm are used as targets used to control and set the passage positions of the light beams "a", "b", "c", "d" at preset pitch intervals (in this example, 42.3 μm). That is, the gap G(B–C) formed between the sensor patterns SB and SC is used as a target for the passage position of the light beam "a", the gap G(C–D) formed between the sensor patterns SC and SD is used as a target for the passage position of the light beam "b", the gap G(D–E) formed between the sensor patterns SD and SE is used as a target for the passage position of the light beam "c", and the gap G(E–F) formed between the sensor patterns SE and SF is used as a target for the passage position of the light beam "d".

Next, the control system is explained.

FIG. 5 shows the control system with attention mainly paid to the control section of the multi-beam optical system. That is, 51 denotes a main control section which controls the whole portion and includes a CPU, for example. The main control section 51 is connected to a memory 52, control panel 53, external communication interface (I/F) 54, laser drivers 32a, 32b, 32c, 32d, polygon mirror motor driver 37, galvano-mirror driving circuits 39a, 39b, 39c, 39d, light sensing device output processing circuit 40 used as signal processing means, synchronizing circuit 55 and image data interface (I/F) 56.

The image data I/F 56 is connected to the synchronizing circuit 55 and an image processing section 57 and page memory 58 are connected to the image data I/F 56. The scanner section 1 is connected to the image processing section 57 and an external interface (I/F) 59 is connected to the page memory 58.

Now, the flow of image data at the time of image formation is simply explained below.

First, in the case of the copying operation, as explained before, an image on an original O is read by the scanner section 1 and transferred to the image processing section 57. The image processing section 57 processes an image signal supplied from the scanner section 1.

Image data from the image processing section 57 is supplied to the image data I/F 56. The image data I/F 56 plays a role in distributing image data to the four laser drivers 32a, 32b, 32c, 32d.

The synchronizing circuit 55 generates a clock in synchronism with timings at which the respective light beams pass over the light sensing device 38 and causes the image data to be output as laser modulation signals to the laser drivers 32a, 32b, 32c, 32d via the image data I/F 56 in synchronism with the clock.

Thus, the operations of forming images are performed synchronously in the main scanning direction (to a correct position) by transferring the image data in synchronism with the scanning operations of the respective light beams.

The synchronizing circuit 55 contains a sample timer which causes the laser oscillators 31a, 31b, 31c, 31d to forcedly emit light in a non-image area so as to control powers of the respective light beams and an on-drum light emission inhibiting timer which prevents the photosensitive drum 15 from being exposed to the light beams emitted by forced light emission by the main control section 51 when the light beam passage (scanning) position control operation which will be described later and the control operation for light beam power between the respective light beams are performed.

The control panel 53 is a man-machine interface which starts the copying operation and sets the number of sheets, for example.

The present digital copying machine is configured to not only perform the copying operation but also form and output image data input from the exterior via the external I/F 59 connected to the page memory 58.

Further, when the present digital copying machine is controlled from the exterior via a network, for example, the external communication I/F 54 plays the role of the control panel 53.

The galvano-mirror driving circuits 39a, 39b, 39c, 39d are circuits which drive the galvano-mirrors 33a, 33b, 33c, 33d according to specified values from the main control section 51. Therefore, the main control section 51 can freely control the angles of the galvano-mirrors 33a, 33b, 33c, 33d via the galvano-mirror driving circuits 39a, 39b, 39c, 39d.

The polygon motor driver 37 is a driver which drives the polygon motor 36 used to rotate the polygon mirror 35 which scans the four light beams as described before. The main control section 51 can give instructions of rotation starting, interruption and switching of the rotation speed to the polygon motor driver 37. Switching of the rotation speed is made when the recording pitch (resolution) is changed.

The laser drivers 32a, 32b, 32c, 32d each emit laser light according to a laser modulation signal synchronized with the scanning operation of the light beam from the synchronizing circuit 55 as explained previously. Further, the laser drivers 32a, 32b, 32c, 32d have a function of forcedly causing the laser oscillators 31a, 31b, 31c, 31d to individually emit laser light according to a forced light emission signal from the main control section 51 irrespective of image data.

The above function is used to confirm the operation state of the laser oscillators 31a, 31b, 31c, 31d. Further, the above function is used in the case where the laser oscillators 31a, 31b, 31c, 31d are caused to forcedly perform the light emission operation so as to scan the light beams on the light sensing device 38 when the control operation for light beam power between the light beams and the light beam passage (scanning) position control operation which will be described later are performed. However, as described previously, it is possible to prevent the photosensitive drum 15 from being exposed by use of the on-drum light emission inhibiting timer in the synchronizing circuit 55.

Further, the main control section 51 sets powers of the light beams emitted from the laser oscillators 31a, 31b, 31c, 31d with respect to the laser drivers 32a, 32b, 32c, 32d. The set values of the light emission powers are changed according to a change of the process condition and detection of the light beam passage position.

The memory 52 is used to store information necessary for the control operation. For example, the optical system unit 13 can be instantly set into an image formation possible state after turn-on of the power supply by previously storing the control amounts of the galvano-mirrors 33a, 33b, 33c, 33d, the circuit characteristic (offset value of the amplifier) to detect the light beam passage position and printing area information items corresponding to the respective light beams.

Next, the light beam position control (printing area setting) operation in the main scanning direction is explained in detail.

Figure 6:
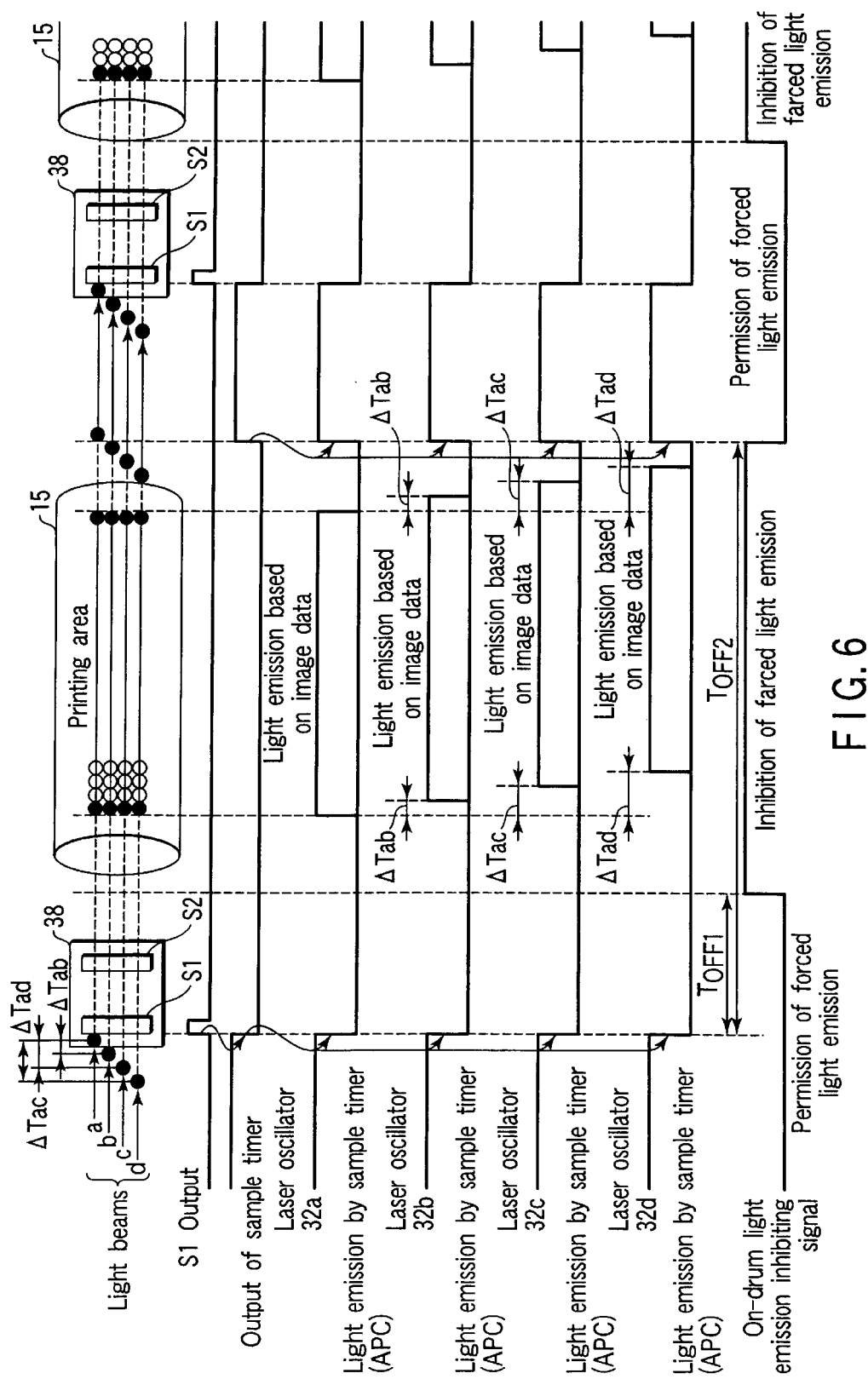
FIG. 6 is a view showing the positional relation between the light sensing device and the photosensitive drum and the positional relation between exposure areas (printing areas) of respective light beams by a sample timer and light emission areas based on image data together with a timing chart.

FIG. 6 is a view showing the positional relation between the sensor patterns S1, S2 of the light sensing device 38 and the photosensitive drum 15 and the positional relation between light emission areas of the light beams "a" to "d" by a sample timer which will be described later, exposure areas (printing areas) based on image data and the output of the on-drum light emission inhibiting timer together with a timing chart.

As shown in FIG. 6, the sample timer is reset by an output of the sensor pattern S1 of the light sensing device 38 to start counting a clock (not shown) from "0". When the sample timer has reached a preset value, the output of the sample timer is set to "H" so as to cause the four laser oscillators 31a to 31d to perform the light emission operation. As shown in FIG. 6, generally, a value set into the sample timer is a value based on which the light beams "a" to "d" pass over the photosensitive drum 15 and then light beams "a" to "d" are emitted before the light beams "a" to "d" are scanned by the next polygon mirror surface.

When scanning of the light beams "a" to "d" by the next polygon mirror surface is started and the first light beam has reached the sensor pattern S1, the sample timer is reset and the operation described above is repeated. That is, the laser oscillators 31a to 31d are forcedly caused to emit light for a preset period for each line in an area which is not related to image formation. During the forced light emission time, the automatic power control (APC) operation for holding the laser light emission power at a preset value is performed for the respective laser oscillators 31a to 31d.

Now, the on-drum light emission inhibiting timer is explained. As the forced light emitting operation, the forced light emitting operation directly specified by the main control section 51 with respect to the laser drivers 32a to 32d is performed as described before in addition to light emission according to the output of the sample timer. In the forced light emitting operation, the main control section 51 selectively causes the laser oscillators 31a to 31d to emit light and the forced light emitting operation is used to scan a light beam on the light sensing device 38 when the operation for controlling light beam power between the light beams and the light beam passage (scanning) position control operation which will be described later are performed in addition to the operation of checking the operation state of the laser oscillators 31a to 31d.

However, while the laser oscillators 31a to 31d are continuously emitting light, the light beams scan and expose the photosensitive drum 15 and the following problems occur.

That is, while the photosensitive drum 15 is kept in a stationary state, a specified portion of the photosensitive drum 15 is intensively exposed and there occurs a possibility that a local portion of the photosensitive drum 15 is degraded. Further, while the photosensitive drum 15 is being rotated, there occurs a possibility that a large amount of toner is attached (consumed) to the photosensitive drum or a large number of carriers are attached thereto.

The on-drum light emission inhibiting timer is used to solve the above problems. As shown in the time chart of FIG. 6, when the timer is operated, the forced light emission by the main control section 51 is inhibited in an area containing the photosensitive drum area. That is, the forced light emission is inhibited (output of the on-drum light emission inhibiting timer: H) at a timing (when $T_{OFF1}$ has elapsed after the output of S1) immediately before the light beam reaches the photosensitive drum 15 after the light beam has passed over the light sensing device 38 with an output of the sensor pattern S1 of the light sensing device 38 used as a reference. Inhibition of the forced light emission is released (output of the on-drum light emission inhibiting timer: L) at a timing (when $T_{OFF2}$ has elapsed after the output of S1) at which the light beam has completely passed over the photosensitive drum 15.

As shown in FIG. 6, generally, light emission based on image data (containing test image data) is performed for the printing area of the photosensitive drum 15. Although detailed explanation is not given here, generally, the positional relation of the light beams in the main scanning direction is not constant in the structure in which a plurality of light beams are synthesized by use of half mirrors and scanned as described before. In FIG. 6, a case wherein the light beam "a" comes first and the light beams "b", "c", "d" follow the light beam "a" is shown as an example. As shown in FIG. 6, the light beam "b" is delayed by ΔTab, the light beam "c" is delayed by ΔTac and the light beam "d" is delayed by ΔTad with respect to the light beam "a" set as a reference.

In order to make the exposure areas by the light beams "a" to "d" with the above positional (phase) relation perfectly coincide with one another, as shown in FIG. 6, it is necessary to determine light emission timings based on image data such that the light beam "b" is delayed by ΔTab, the light beam "c" is delayed by ΔTac and the light beam "d" is delayed by ΔTad with respect to the light beam "a" set as a reference.

Generally, when the exposure areas are set, they are adjusted in a one-clock unit (in a one-pixel unit) based on the reference clock. However, in the optical system configuration of this example, it is not assured that the positional relation between the light beams is deviated by the one-clock unit and it is necessary to finely adjust the exposure areas.

Figure 7:
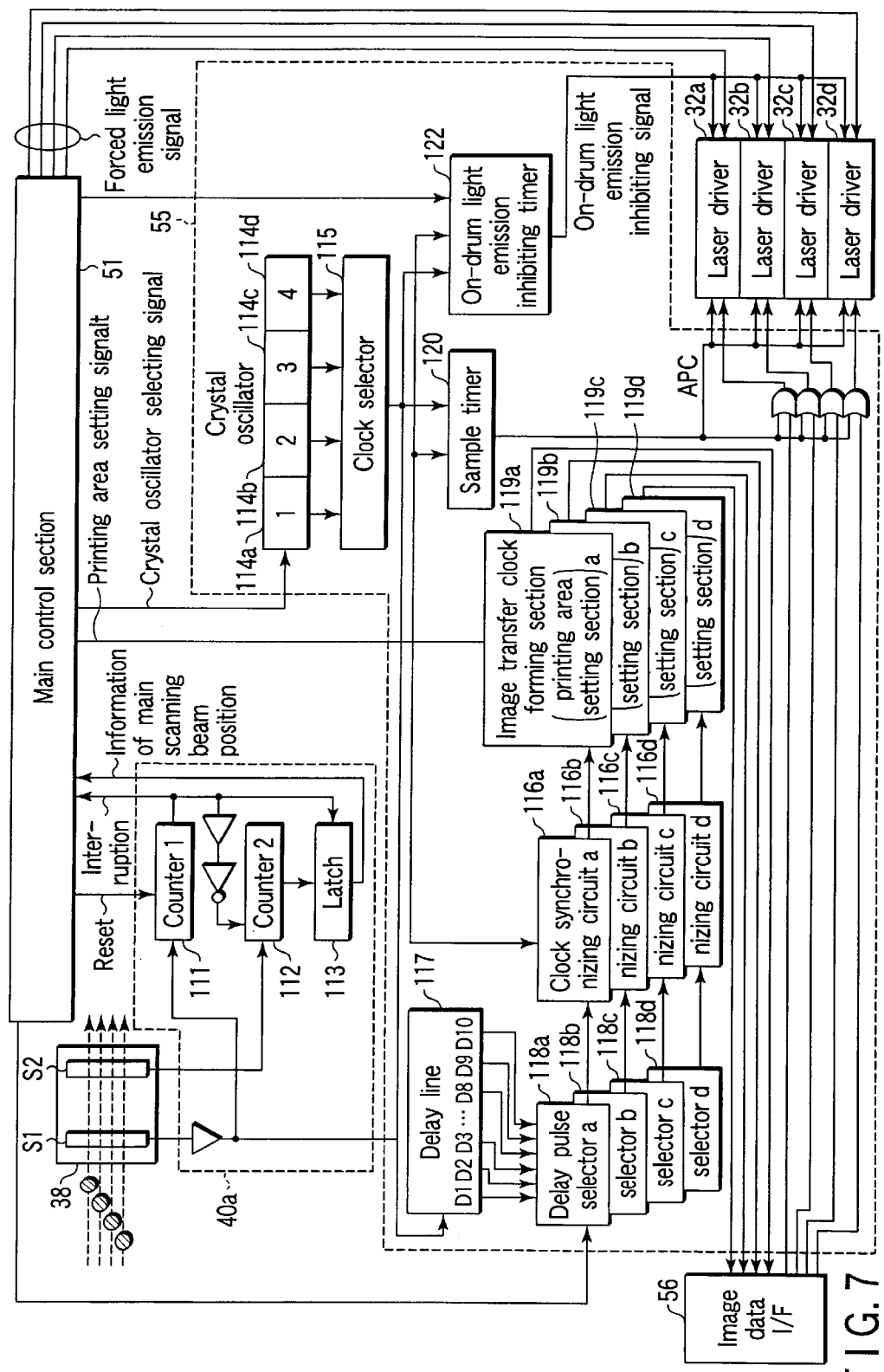
FIG. 7 is a block diagram showing the configuration to set a printing area (exposure area) in the minute unit smaller than one clock by use of a delay pulse.

FIG. 7 shows the configuration to set a printing area (exposure area) in the minute unit smaller than one clock by use of a delay pulse and the configuration to prevent drum exposure by the forced light exposure as described before. FIG. 7 shows only an extracted portion associated with the printing area in the block diagram of FIG. 5.

In FIG. 7, 40a denotes a circuit which detects a light beam position in the main scanning direction and is provided in the light sensing device output processing circuit 40. The circuit 40a includes a first counter 111, second counter 112 and latch circuit 113.

The synchronizing circuit 55 includes four crystal oscillators 114a to 114d, a selector 115 which selects one of the outputs of the crystal oscillators 114a to 114d, a sample timer 120 and on-drum light emission inhibiting timer 122 operated in response to a clock output from the clock selector 115 used as a reference and reset by an output of the sensor pattern S1 of the light sensing device 38, a delay line 117 which generates a plurality of delay pulses (D1 to D10) based on an output pulse of the sensor pattern S1 of the light sensing device 38, delay pulse selectors 118a to 118d which select optimum delay pulses for the respective light beams from the plurality of delay pulses output from the delay line 117, clock synchronizing circuits 116a to 116d which respectively synchronize the clock output from the clock selector 115 with the delay pulses output from the delay pulse selectors 118a to 118d, and image transfer clock forming sections (printing area setting sections) 119a to 119d which form image transfer clocks for the respective light beams based on the synchronizing clocks output from the clock synchronizing circuits and output the clocks to the image data I/F 56.

Next, the circuit configuration shown in FIG. 7 is explained in detail.

First, the configuration to prevent drum exposure by the forced light emission is explained. As shown in FIG. 7, the main control section 51 can cause the laser oscillators 31a to 31d to forcedly emit light by individually supplying forced light emission signals to the laser drivers 32a to 32d.

However, the laser drivers 32a to 32d are configured to make the forced light emission signals from the main control section 51 ineffective while the on-drum light emission inhibiting signal is being output from the on-drum light emission inhibiting timer 122. Therefore, the light emitting operation of the laser oscillators 31a to 31d is inhibited even when the forced light emission signals are output from the main control section 51.

The operation of the on-drum light emission inhibiting timer 122 is controlled by a start/stop signal from the main control section 51. That is, when a stop signal is output from the main control signal 51 to the on-drum light emission inhibiting timer 122, the timer operation is interrupted and the on-drum light emission inhibiting timer 122 does not output the on-drum light emission inhibiting signal to the laser drivers 32a to 32d. Therefore, the main control section 51 can cause the laser oscillators 31a to 31d to continuously perform the light emitting operation by interrupting the on-drum light emission inhibiting timer 122 by use of a stop signal and outputting the forced light emission signals to the laser drivers 32a to 32d.

When the main control signal 51 triggers the on-drum light emission inhibiting timer 122 by use of a start signal, the laser oscillators 31a to 31d do not perform the light emitting operation while the on-drum light emission inhibiting signal is being output from the on-drum light emission inhibiting timer 122 to the laser drivers 32a to 32d even if the forced light emission signals are output from the main control section 51 to the laser drivers 32a to 32d.

The operation timing of the on-drum light emission inhibiting timer 122 is determined as explained with reference to FIG. 6. That is, while the light beam is being scanned by the polygon mirror 35, the on-drum light emission inhibiting timer 122 is operated with a pulse signal output from the sensor pattern S1 used as a reference by scanning the light beam on the sensor pattern S1 of the light sensing device 38.

That is, when a pulse signal is output from the sensor pattern S1, an on-drum forced light emission inhibiting signal is set to "H" (high) before the light beam reaches the photosensitive drum 15 after time TOFF1 has elapsed and the forced light emission operation by the main control section 51 is interrupted. Then, when the light beam has passed over the photosensitive drum 15 after a pulse signal was output from the sensor pattern S1 and time TOFF2 elapsed, an on-drum forced light emission inhibiting signal is set to "L" (low) and the forced light emission operation by the main control section 51 becomes effective.

As described above, the main control section 51 can expose the light sensing device 38 by use of the light beams without exposing the photosensitive drum 15 irrespective of the movement of the light beams by outputting the forced light emission signal to the laser drivers 32a to 32d and outputting the start signal to the on-drum light emission inhibiting timer 122.

The operation for controlling light beam power between light beams and the light beam passage (scanning) position control operation are explained in detail later. However, if no particular information is given, the explanation is made on the assumption that the on-drum light emission inhibiting timer 122 is triggered and the photosensitive drum 15 is not exposed.

Next, the configuration to set a printing area (exposure area) in the minute unit smaller than one clock is explained. As described before, the sensor pattern S1 of the light sensing device 38 is exposed by any one of the light beams "a", "b", "c", "d" (or two or more light beams in some cases) forcedly emitted by the sample timer 120 and the signal level is changed from "L" (low) to "H" (high) (refer to FIG. 8). As explained before, the signal is input to the sample timer 120 to release the forced light emitting operation of the laser oscillators 31a to 31d.

Therefore, the light beams "a", "b", "c", "d" disappear and an output of the sensor pattern S1 becomes a pulse signal (when the response speed of the sample timer 120 is low, the output becomes a pulse signal by the passage of a first light beam in some cases).

The output of the sensor pattern S1 is also input to the delay line 117 in the synchronizing circuit 55. The delay line 117 has a function of delaying the input signal by a constant period of time. The delay line 117 shown in FIG. 7 has ten taps as output terminals. Therefore, as shown in FIG. 8, an output (pulse) of the sensor pattern S1 is output as pulses D1 to D10 having phases sequentially delayed by preset time ($\Delta$td).

Figure 8:
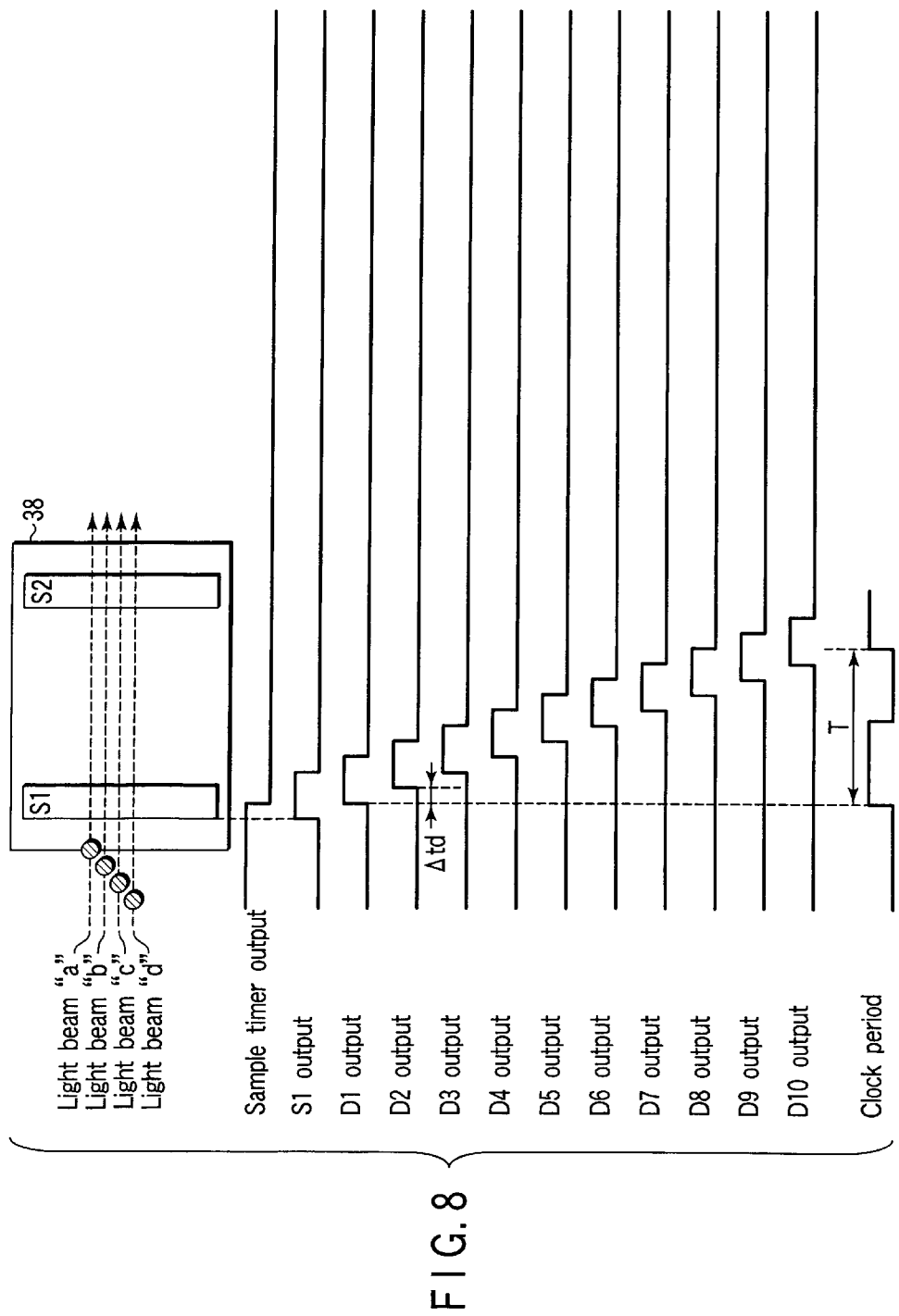
FIG. 8 is a diagram for illustrating a delay pulse.

In the case of this embodiment, as shown in FIG. 8, the delay amount ($\Delta$td) between the delay line output terminals is approximately 1/10 of the clock period (T). In this example, the delay amount of the delay line 117 is set to approximately 1/10 of the clock period (T), but if higher setting precision of the printing area is required, the delay amount for one tap may be made smaller and the number of taps may be increased.

Each of the delay pulse selectors 118a to 118d for the light beams "a" to "d" selects one delay pulse which is optimum for the corresponding light beam from the delay pulses D1 to D10 output from the delay line 117 and outputs the selected delay pulse to a corresponding one of the succeeding-stage clock synchronizing circuits 116a to 116d. A delay pulse to be selected is specified by the main control section 51. The method will be described in detail later.

Next, the operations of the clock synchronizing circuits 116a to 116d and image transfer clock forming sections (printing area setting sections) 119a to 119d are explained with reference to the timing chart of FIG. 8. As explained before, the clock synchronizing circuits 116a to 116d are supplied with a clock selected by the clock selector 115 and delay pulses selected by the respective delay pulse selectors 118a to 118d.

The operation of the clock synchronizing circuit 116* (* indicates one of "a" to "d" if no specific explanation is made) is to output a clock having the same frequency as the input clock and synchronized with an input delay pulse.

Figure 9:
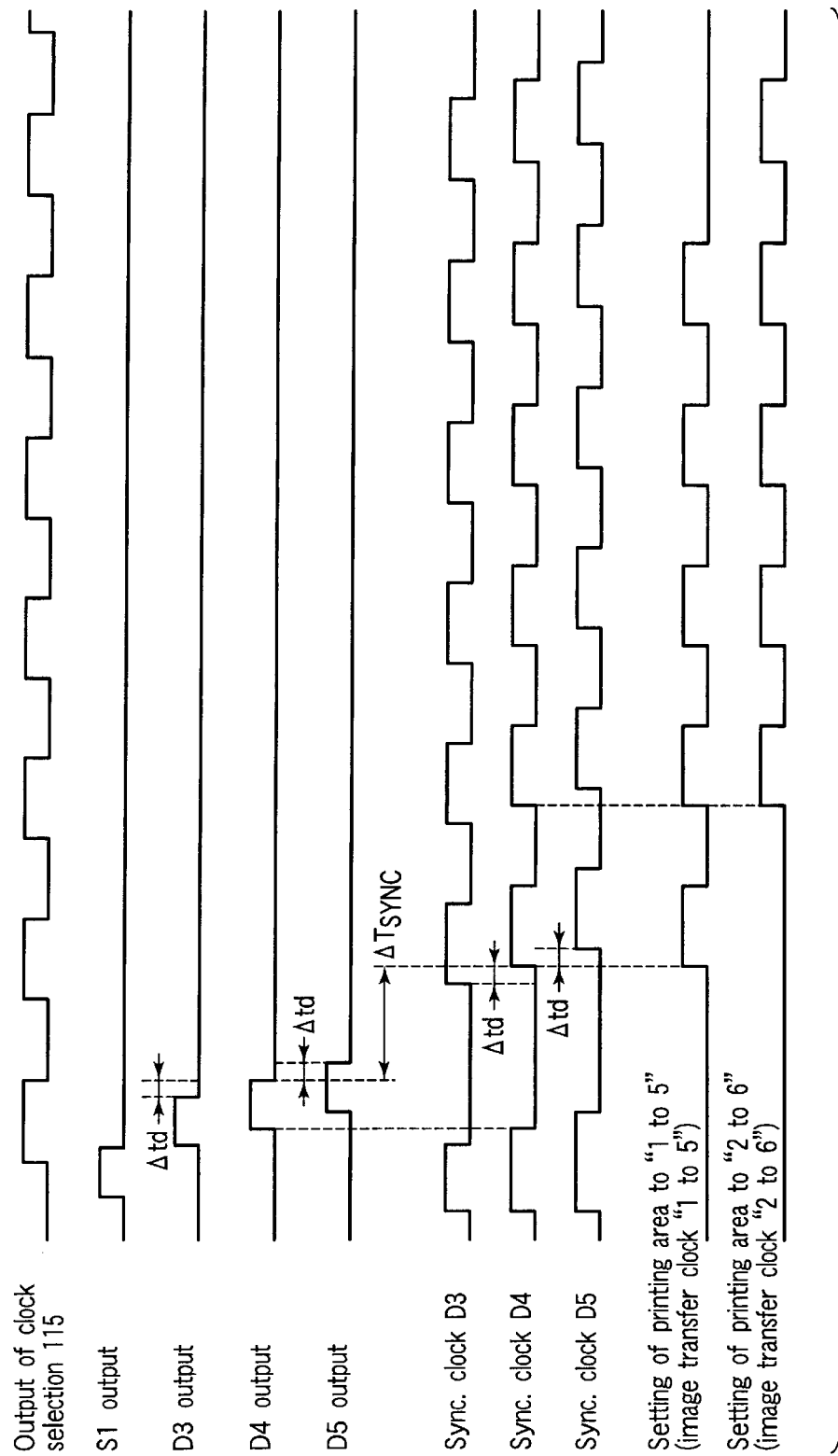
FIG. 9 is a diagram for illustrating a delay pulse and sync clock.

In FIG. 9, a sync clock D3 in a case where D3 is input as a delay pulse, a sync clock D4 in a case where a delay pulse D4 is input, and a sync clock D5 in a case where a delay pulse D5 is input are shown. In each of the above cases, it is understood that a sync clock having the same frequency as an output of the clock selector 115 input as an input clock and delayed by $\Delta T_{SYNC}$ with respect to the trailing edge of the input delay pulse is output.

The thus obtained sync clock is input to the image transfer clock forming section (printing area setting section) 119* and the main control section 51 can set a printing area for each beam in the one-clock unit (in the one-pixel unit) based on the sync clock by using the printing area setting signal. That is, the output timing of the image transfer clock and the number of outputs can be set by using the clock synchronized with the selected delay pulse as a reference.

The output states of clock pulses obtained where the delay pulse D4 is selected and an area from the first pixel (dot) to the fifth pixel (dot) is set as a printing area by use of the sync clock D4 and where an area from the second pixel (dot) to the sixth pixel (dot) is set as a printing area are shown as a simple example. It is understood that clock pulses are output at timings corresponding to the first clock to the fifth clock of the sync clock D4 and the second clock to the sixth clock thereof.

The printing area setting operation for setting the printing area in a range of several dots plays an important role when information of the beam position in the main scanning direction which will be described later is acquired. However, as described before, at the time of normal image formation, the printing area is generally set so that the light emission areas of is the light beams "a" to "d" will be set in a preset position on the photosensitive drum 15. In this case, the preset position is changed according to the size and binding margin of paper used.

The thus obtained image transfer clock (printing area signal) is supplied to the image data I/F 56 and image data items (laser modulation signals) corresponding to the light beams "a" to "d" are output in synchronism with the image transfer clock (printing area signal). The laser drivers 32a to 32d modulate the outputs of the laser oscillators 31a to 31d according to the image data items (laser modulation signals).

Thus, the main control section 51 can finely shift the printing areas in the 1/10-clock unit (in the 1/10-pixel unit) by using delay clock selection signals for the delay pulse selectors 118a to 118d for the respective light beams. Also, it can set the printing areas in the one-clock unit (in the one-pixel unit) by using printing area setting signals for the image transfer clock forming sections (printing area setting sections) 119a to 119d.

Next, the principle of the method of acquiring information of the beam positions in the main scanning direction of the light beams "a" to "d" to permit the main control section 51 to set the printing areas in the one-clock unit (in the one-pixel unit) and in the 1/10-clock unit (in the 1/10-pixel unit) is explained with reference to FIG. 10.

Figure 10:
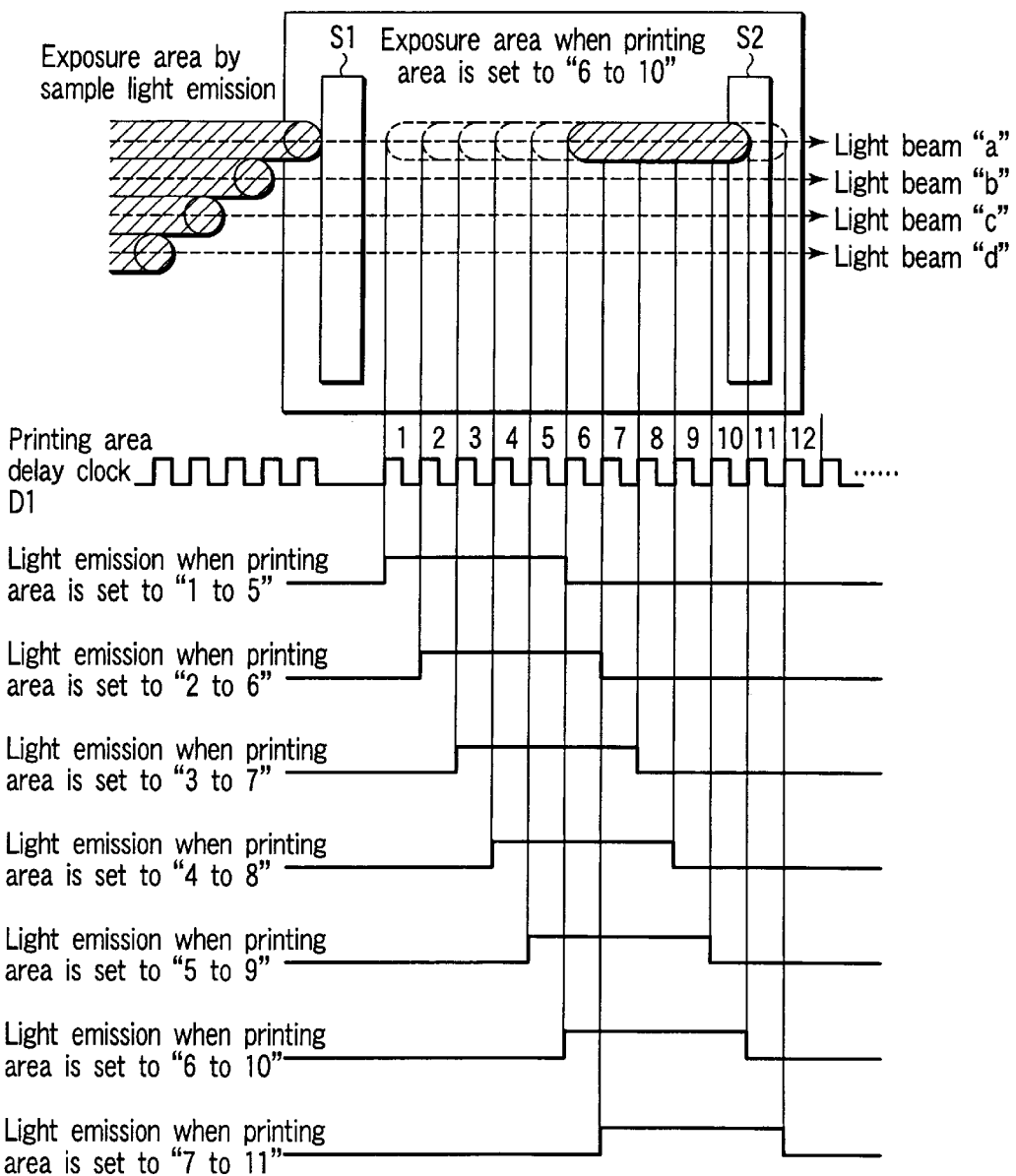
FIG. 10 is a diagram for illustrating the principle of a method for acquiring information of beam positions in the main scanning direction for respective light beams.

FIG. 10 shows a case where a value which is extremely smaller than in the case of normal image formation is set in the image transfer clock forming section (printing area setting section) 119a explained before. As shown in FIG. 10, for example, when the main control section 51 selects the delay pulse D1 with respect to the light beam "a", sets the printing area to "1 to 5", and specifies solid black printing (emission of laser light in the printing area) as a test printing command with respect to the image data I/F 56, then the light beam "a" exposes a portion of the printing area "1 to 5".

If the printing area is set to a small value, the light beam does not reach the photosensitive drum 15 and scans the light sensing device 38. In this state, if the output of the sensor pattern S2 which lies on the downstream side with respect to the sensor pattern S1 is monitored, the main control section 51 can acquire information on the size of the printing area required for the sensor pattern S2 to make a response. In the example shown in FIG. 10, it is understood that the sensor pattern S2 starts making a response when the printing area is set to "6 to 10".

Thus, the main control section 51 can detect the relative positional relation of the light beam "a" with respect to the output of the sensor pattern S1 by the one-clock unit (in the one-pixel unit).

Next, a method for detecting the relative positional relation of the light beam "a" with respect to the output of the sensor pattern S1 in the unit equal to or smaller than one clock (one pixel) is explained with reference to FIG. 11. As explained in FIG. 10, when the delay pulse D1 is selected and if the printing area for the light beam "a" is set to "6 to 10", then the sensor pattern S2 makes a response. Therefore, the main control section 51 reduces the setting value of the printing area to "5 to 9" and changes selection of the delay pulse.

Figure 11:
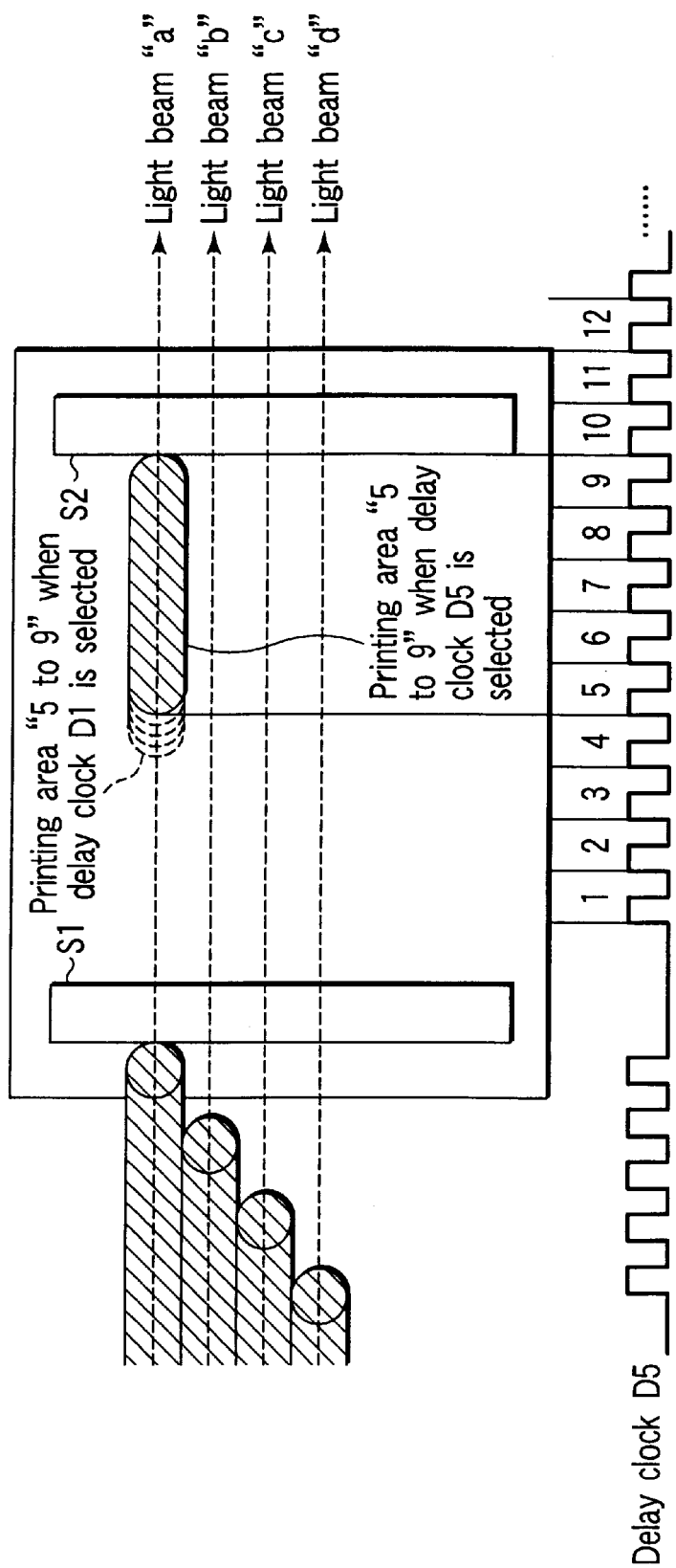
FIG. 11 is a view for illustrating a method for sensing the relative positional relation between the light beams with respect to outputs of the light sensing device.

As shown in FIG. 11, the printing area moves in the right direction by the 1/10-clock unit (1/10-pixel unit) as the delay pulse is changed in the order of D1→D2→D3. In this example, when the delay pulse D5 is selected, the sensor pattern S2 starts making a response.

Therefore, the main control section 51 can detect that the right end of the printing area of the light beam "a" exposes the sensor pattern S2 by setting the printing area "5 to 9" and selecting the delay pulse D5 if the printing area of five pixels is set with the output of the sensor pattern S1 used as a reference.

There is a possibility that the sensor pattern S1 will be exposed again according to the printing area and a second pulse will be output depending on the positional relation thereof with respect to the first light beam. However, the above problem can be solved by providing a circuit which makes only the first pulse output effective (detailed explanation thereof is omitted here).

By performing the above detecting operation for the light beams "b", "c", "d", information on the positional relations of the respective light beams with respect to the output of the sensor pattern S1 caused by the first light beam can be obtained. At the time of the actual printing operation, the main control section 51 can correctly make the printing areas coincide with one another with the precision of 1/10 clock (1/10 pixel) by selecting the delay pulses and setting the printing areas with respect to the light beams "a" to "d" based on the above positional relations.

The main control section 51 stores information on the light beams "a" to "d" thus obtained into the memory 52. It is preferable that the memory 52 is of a nonvolatile type.

Further, even when the printing area is set in the main scanning direction again and if the above information is stored in the memory 52, the operation can be completed only by fine adjustment and it is not necessary to take extra time for the control operation.

Next, the operation of the circuit 40a which detects a light beam position in the main scanning direction in the light sensing device output processing circuit 40 is explained.

As described before, the main control section 51 can detect the light beam position in the main scanning direction by monitoring the output of the sensor pattern S2 while changing selection of the delay pulses with respect to the light beams "a" to "d" and changing the printing areas. However, in this example, a method for fetching the output of the sensor pattern S2 into the main control section 51 is explained.

Figure 12:
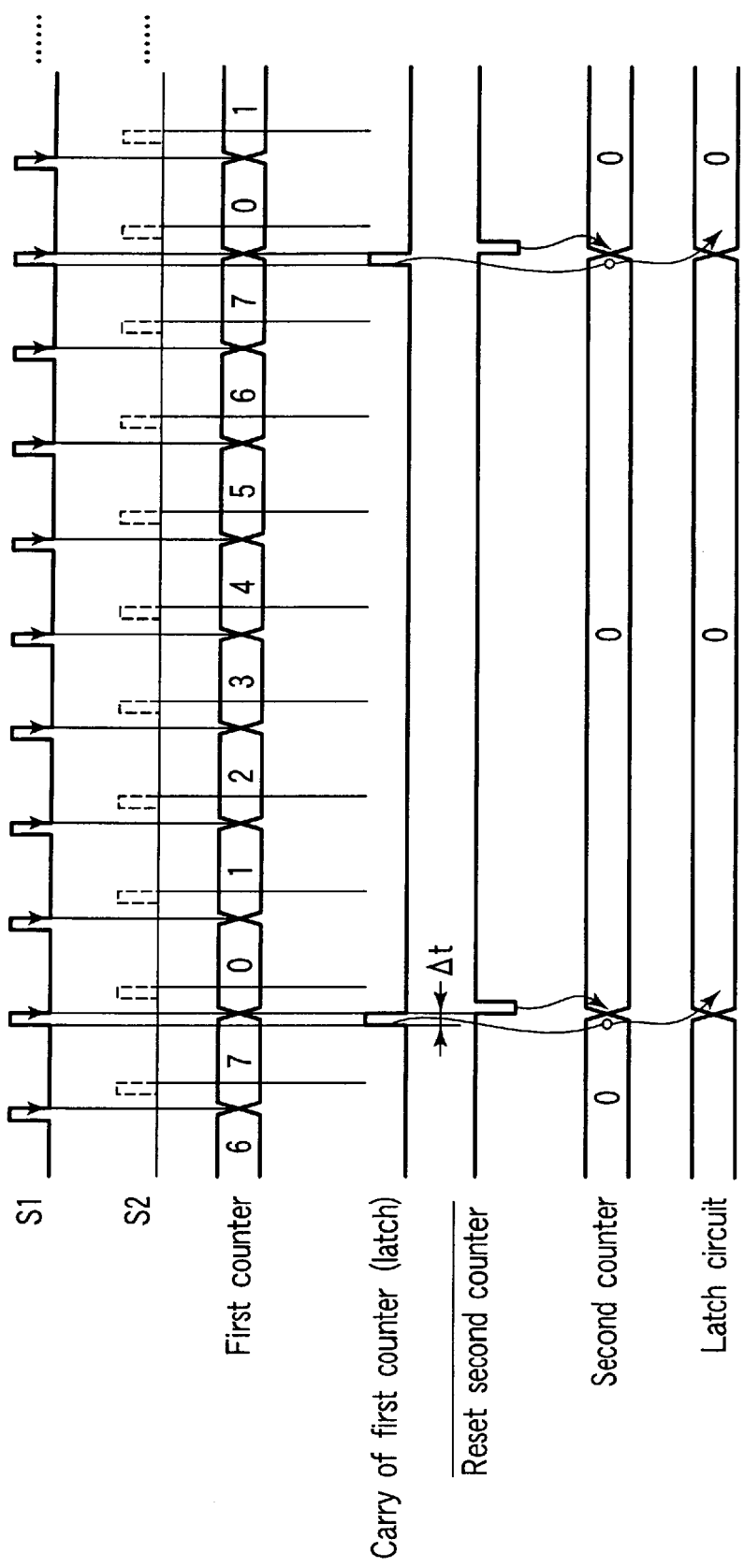
FIG. 12 is a diagram for illustrating the operation of a circuit for sensing the light beam position in the main scanning direction.

FIG. 12 is a timing chart for illustrating the operation in a case where the light beams "a" to "d" do not expose the sensor pattern S2 at all. As described before, the sensor pattern S1 outputs one pulse-like signal for each scanning operation without fail by causing the first light beam to expose the sensor pattern S1 since the laser oscillators 31a to 31d are caused to forcedly emit lights by use of the sample timer 120.

The first counter 111 is a counter which counts the pulse signal from the sensor pattern S1 and, for example, endlessly counts "0 to 7" and outputs a carry signal in the latter half period of the count "7" as shown in FIG. 12. The second counter is a counter which counts the output of the sensor pattern S2.

The second counter 112 is cleared (reset) by a signal obtained by delaying the carry signal of the first counter Ill as explained above. Therefore, the count of the second counter 112 is set to "0" for every eight scanning operations.

The latch circuit 113 latches (holds) an output value of the second counter 112. The latch timing of the latch circuit 113 is set equal to the leading edge of the carry signal of the first counter 111. Therefore, the latch circuit 113 can hold a value obtained before the second counter 112 is reset.

A value latched in the latch circuit 113 is updated when the first counter 111 outputs a next carry signal and a count value (the newest count) of the second counter 112 which is obtained immediately before generation of the carry signal is always held in the latch circuit 113. The main control section 51 can acquire the newest information by reading the value (information of the beam position in the main scanning direction) held in the latch circuit 113.

In the case of FIG. 12, since the sensor pattern S2 does not sense the light beam at all, the count of the second counter 112 is always set at "0" and a value held in the latch circuit 113 is also "0". Therefore, the main control section 51 can get information that the sensor pattern S2 does not sense the light beam based on the latched count "0".

Figure 13:
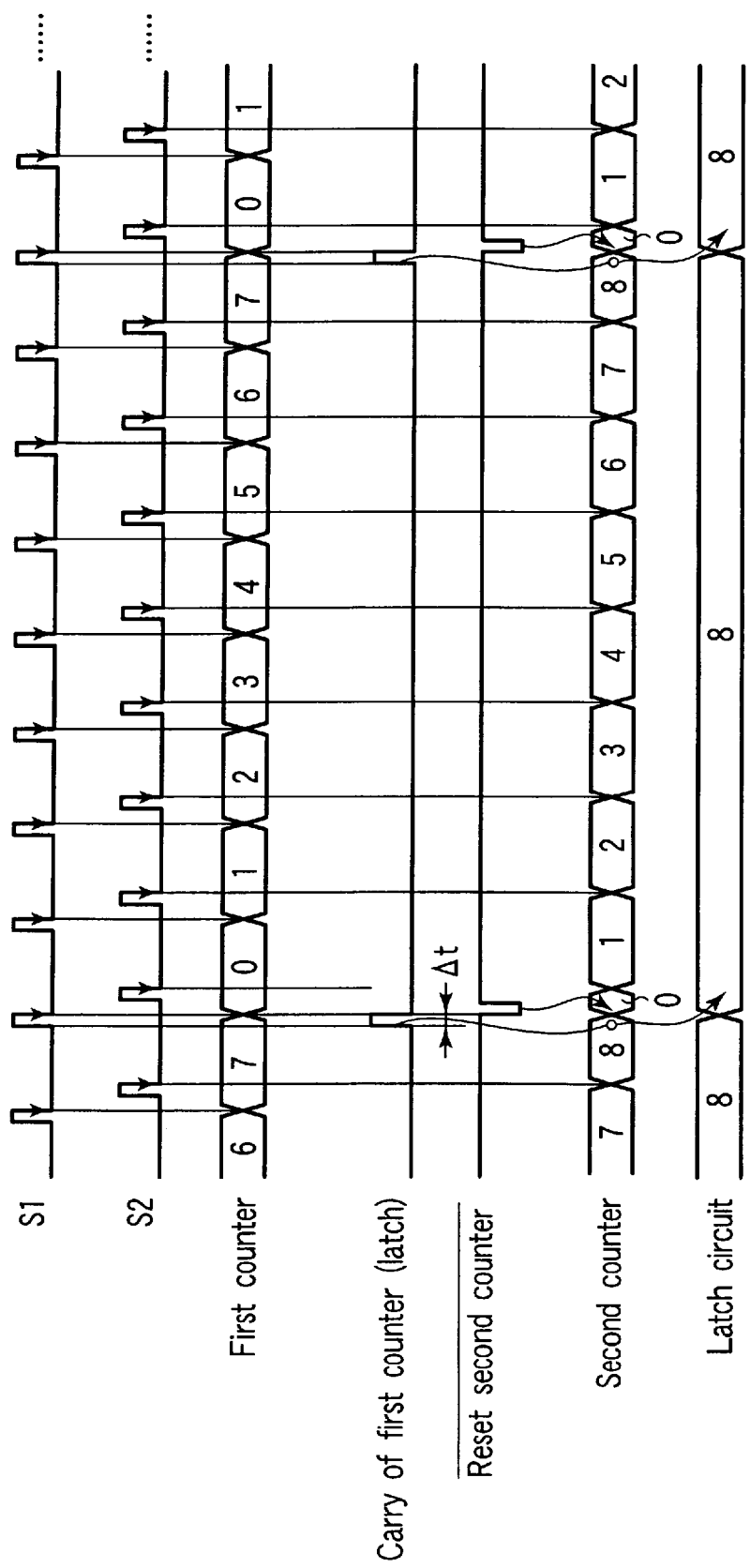
FIG. 13 is a diagram for illustrating the operation of the circuit for sensing the light beam position in the main scanning direction.

FIG. 13 is a timing chart for illustrating the operation in a case where the sensor pattern S2 always senses the light beam.

As shown in FIG. 13, the second counter 112 which counts the output of the sensor pattern S2 counts "0 to 8" in response to the output of the sensor pattern S2. This operation is simply explained. The second counter 112 is cleared (reset) to "0" by a carry output delay signal of the counter, but the output of the sensor pattern S2 is instantly input and the count thereof is set to "1".

After this, the count is counted up in response to the output of the sensor pattern S2 for each scanning operation and reaches "8" at the time of the eighth scanning operation and the value "8" is held in the latch at timing when the carry signal is output from the first counter 111. After the value "8" is held in the latch circuit 113, the second counter 112 is cleared (reset) to "0" again and starts counting from the count "1".

Thus, while the sensor pattern S2 always senses the light beam, the value held in the latch circuit 113 is set to "8". Therefore, the main control section 51 can determine that the sensor pattern S2 always senses the light beam when the value held in the latch circuit 113 is "8".

Figure 14:
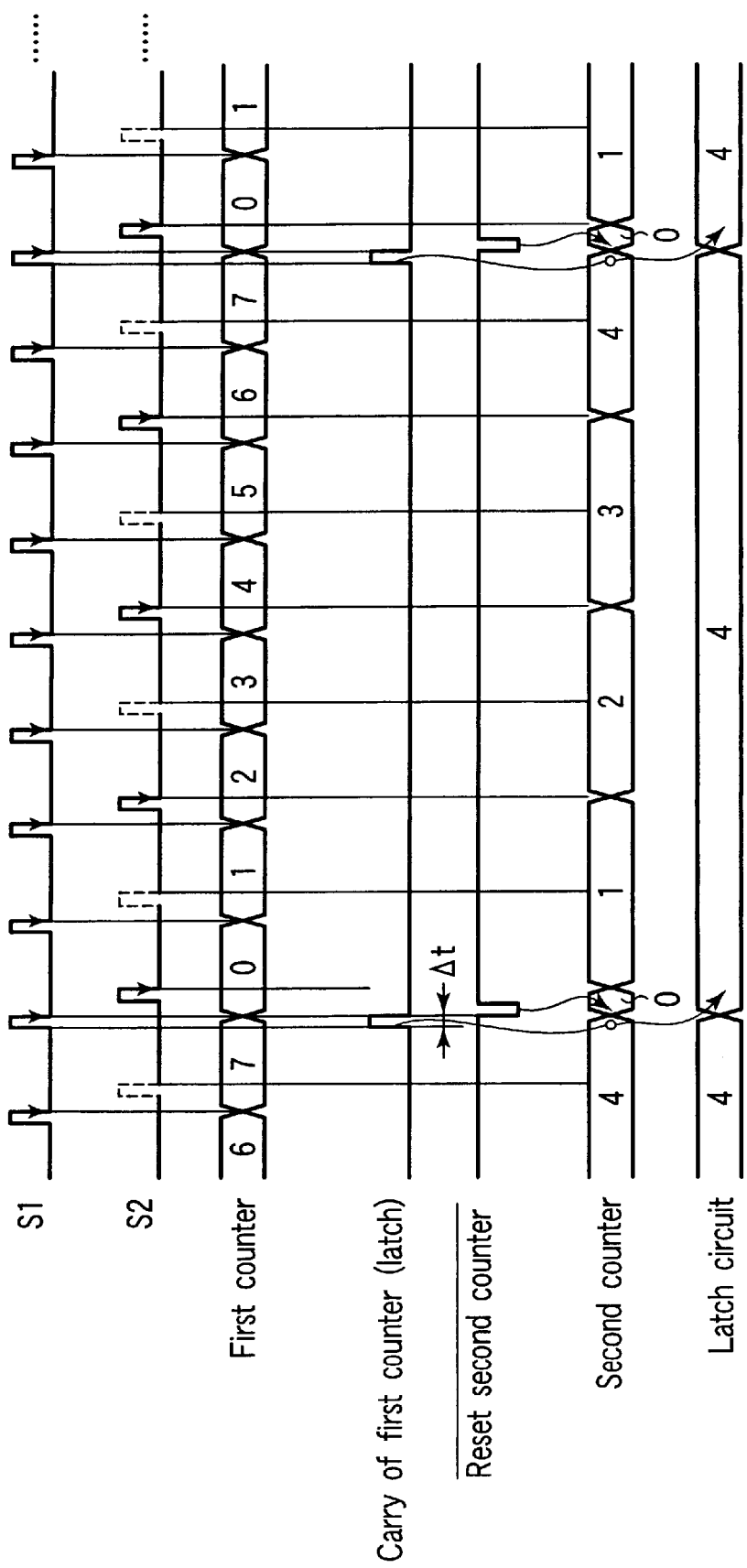
FIG. 14 is a diagram for illustrating the operation of the circuit for sensing the light beam position in the main scanning direction.

FIG. 14 is a timing chart for illustrating the operation in a case where the sensor pattern S2 senses the light beam in some cases and does not sense the light beam in other cases. Since the sensor pattern S2 senses the light beam in some cases and does not sense the light beam in other cases, the count of the second counter 112 increases by a certain scanning operation and does not increase by another scanning operation. In the case of this example, since the sensor pattern S2 outputs a signal for every other scanning operations, the value held in the latch circuit 113 is set to "4". Therefore, the main control section 51 determines that the positional relation between the edge of the printing area and the signal of the sensor pattern S2 is indefinite by reading the value "4" held in the latch circuit 113.

For example, the merits obtained by thus counting the output of the sensor pattern S2 by plural times are as follows:

1) The indefinite positional relation between the printing area and the sensor pattern S can be acquired.
2) The main control section 51 is only required to read information by the unit of eight scanning operations and the load thereof is alleviated in comparison with a case where it reads information for each scanning operation.

Further, it is preferable to set the information fetching unit to an integer multiple of the number of surfaces of the polygon mirror by taking the profile irregularity for each polygon mirror surface into consideration.

Next, the relation between light beam power and printing area setting precision is explained.

Figure 15:
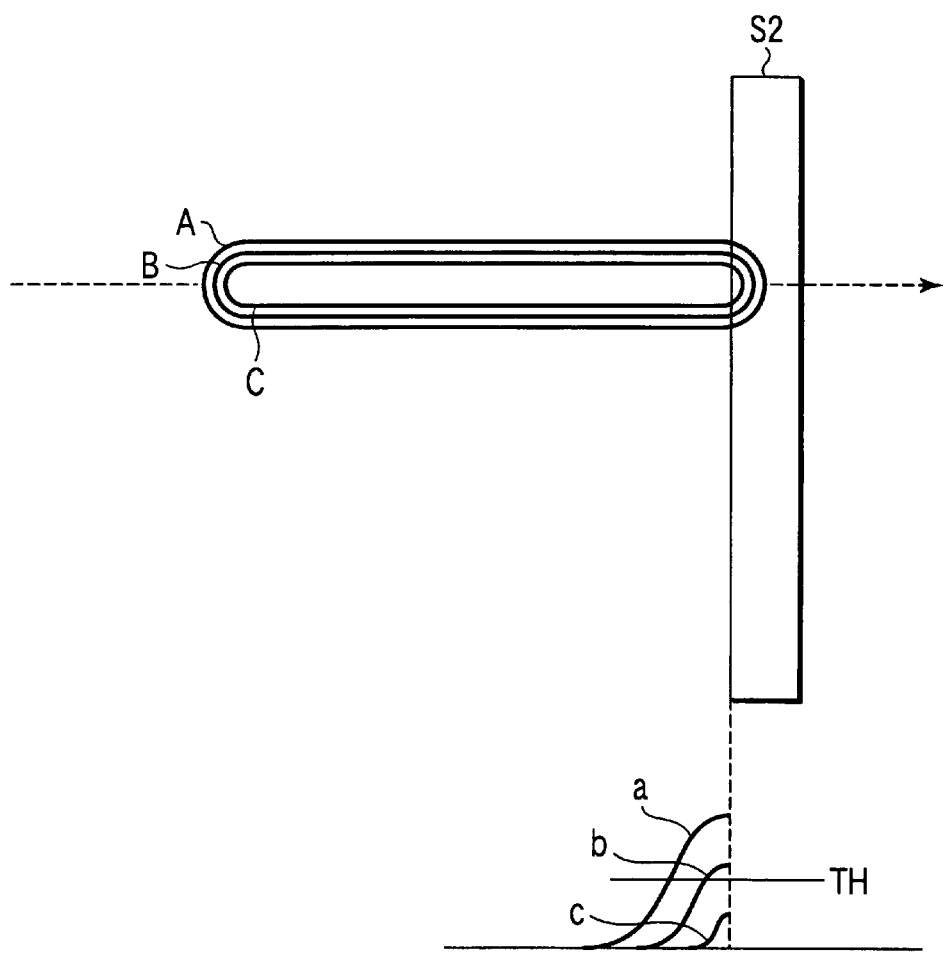
FIG. 15 is a view schematically showing exposure areas when light beam powers are different.

FIG. 15 schematically shows exposure areas when the same delay pulse is selected, the same number of setting clocks for the printing area is used and light beam powers are different. In FIG. 15, the light beam power is the strongest in the case of A and sequentially becomes weaker in the order of B, C.

As shown in FIG. 15, when an area which is exposed by a certain or larger amount of energy is considered, the area becomes larger as the light beam power becomes stronger. In this case, if the response characteristic of the sensor pattern S2 is considered, it is understood that the response characteristic of the sensor pattern S2 becomes different even when the same printing area is set.

As shown in FIG. 15, when the edge of the exposure area of the light beam is set in substantially the same position as the edge of the sensor pattern S2, the sensor pattern S2 makes a response in some cases and does not make a response in other cases depending on the light beam power. In the example of FIG. 15, in the cases of the light beam powers A and B, outputs a, b of the sensor pattern S2 reach a threshold level TH and the second counter 112 counts the outputs. However, in the case of the light beam power C, an output c of the sensor pattern S2 does not reach the threshold level TH and the second counter 112 cannot count the output.

Therefore, in order to precisely and uniformly set the printing areas of the plural light beams, it is necessary to set powers of the light beams to the same value before the printing area control operation is performed.

Next, the light beam passage (scanning) position control operation is explained in detail.

Figure 16:
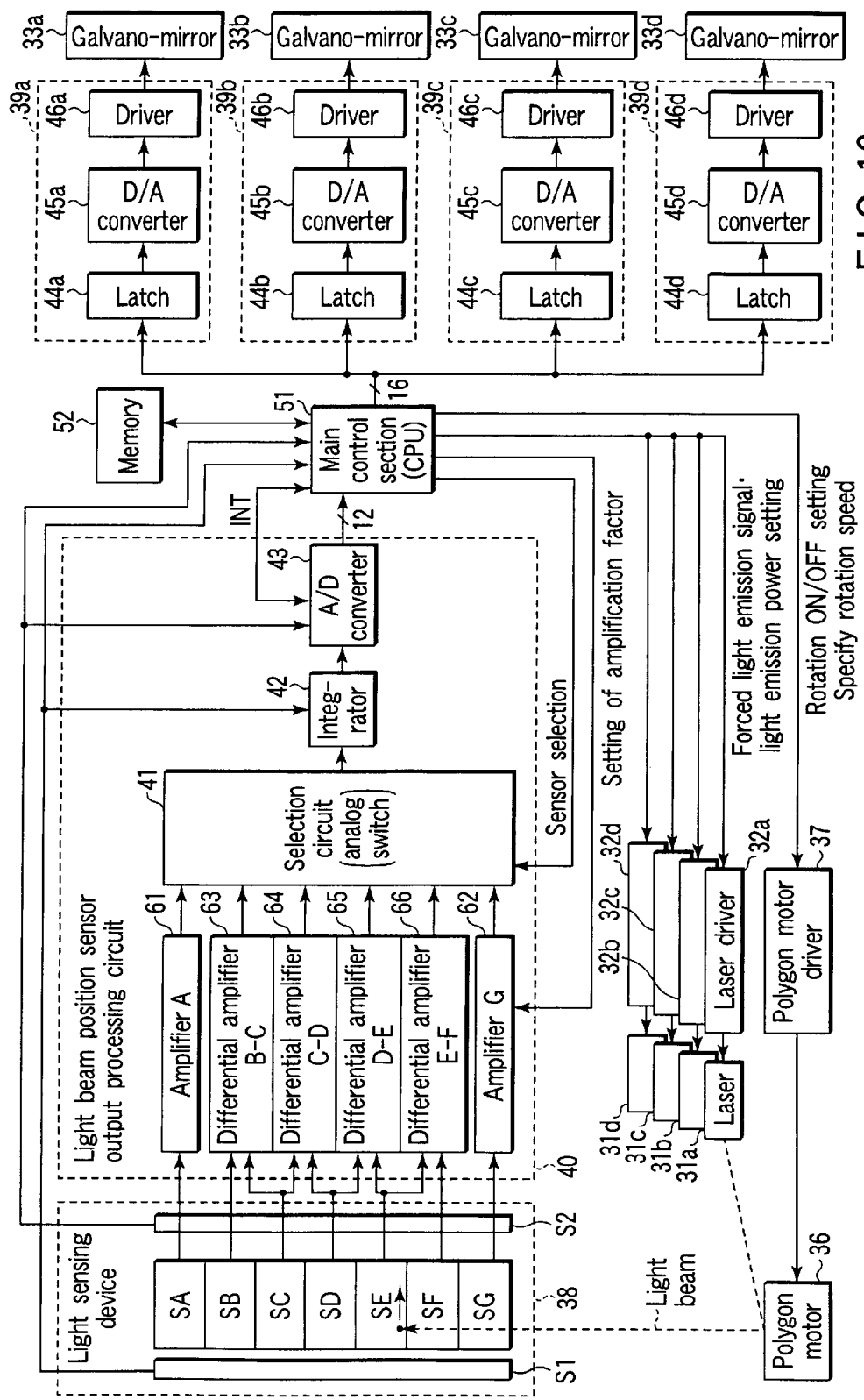
FIG. 16 is a block diagram for illustrating the light beam passage position control operation and offset detection/correction process.

FIG. 16 is a diagram for illustrating the light beam passage position control operation when the light sensing device 38 of FIG. 3 is used and shows an extracted portion associated with the light beam passage position control operation in detail with attention paid to the control operation in the block diagram of FIG. 5.

As explained before, a pulse-like signal indicating that the light beam has passed is output from the sensor patterns S1, S2 of the light sensing device 38. Further, independent signals are output from a plurality of sensor patterns SA to SG according to the light beam passage position.

Output signals from the sensor patterns SA, SG among the plurality of sensor patterns SA to SG are respectively input to amplifiers 61, 62 (which are hereinafter referred to as amplifiers A, G in some cases). The amplification factors of the amplifiers 61, 62 are set by the main control section 51 which is configured by a CPU.

Further, as explained before, the light beam passage position is set on the sensor pattern SA or SG by controlling the galvano-mirrors 33a to 33d and relative light beam power on the photosensitive drum 15 is detected by monitoring the output of the sensor pattern SA or SG.

Output signals from the sensor patterns SB to SF among the plurality of sensor patterns SA to SG are respectively input to differential amplifiers 63 to 66 (which are hereinafter referred to as amplifiers B–C, C–D, D–E, E–F in some cases) which respectively amplify differences between output signals of every two adjacent ones of the sensor patterns SA to SG. More specifically, the differential amplifier 63 amplifies the difference between the output signals of the sensor patterns SB and SC, the differential amplifier 64 amplifies the difference between the output signals of the sensor patterns SC and SD, the differential amplifier 65 amplifies the difference between the output signals of the sensor patterns SD and SE, and the differential amplifier 66 amplifies the difference between the output signals of the sensor patterns SE and SF.

Output signals of the amplifiers 61 to 66 are input to a selection circuit (analog switch) 41. The selection switch 41 selects a signal to be input to an integrator 42 according to a sensor selection signal from the main control section (CPU) 51. The output signal of the amplifier selected by the selection circuit 41 is input to and integrated by the integrator 42.

A pulse-like signal output from the sensor pattern S1 is also input to the integrator 42. The pulse-like signal from the sensor pattern S1 is used as a reset signal (integral operation starting signal) which resets the integrator 42 and, at the same time, starts the new integral operation. The role of the integrator 42 is to reduce noise, eliminate an influence by the mounting inclination of the light sensing device 38 and the like, and will be explained in detail later.

An output of the integrator 42 is input to an A/D converter 43. The pulse-like signal from the sensor pattern S2 is also input to the A/D converter 43. The A/D converting operation of the A/D converter 43 is started when a signal from the sensor pattern S2 is applied as a conversion starting signal. That is, A/D conversion is started at timing when the light beam passes the sensor pattern S2.

Thus, the integrator 42 is reset in response to the pulse signal from the sensor pattern S1 immediately before the light beam passes the sensor patterns SA to SG, and at the same time, the integral operation thereof is started. The integrator 42 integrates the signal indicating the light beam passage position while the light beam is passing over the sensor patterns SA to SG.

By A/D-converting the result of integration of the integrator 42 by use of the A/D converter 43 in response to the pulse signal form the sensor pattern S2 used as a trigger immediately after the light beam has passed over the sensor patterns SA to SG, a sensing signal used for light beam passage position sensing which contains less noise and from which an influence by the mounting inclination of the light sensing device 38 is eliminated can be converted into a digital signal.

The A/D converter 43 which has completed the A/D converting operation outputs an interruption signal INT indicating that the process is terminated to the main control section 51.

The amplifiers 61 to 66, selection circuit 41, integrator 42 and A/D converter 43 configure the light sensing device output processing circuit 40.

The light beam power sensing signal and light beam position detecting signal from the light sensing device 38 which are converted into digital signals are input to the main control section 51 as relative light beam power information or light beam position detecting information on the photosensitive drum 15. Thus, the light powers of the respective light beams and the light beam passage positions on the photosensitive drum 15 are determined.

Light emission powers of the laser oscillators 31a to 31d and the control amounts of the galvano-mirrors 33a to 33d are calculated in the main control section 51 based on the thus obtained relative light beam power sensing signal and light beam position detecting signal on the photosensitive drum 15. The results of calculation are stored in the memory 52 as required. The main control section 51 supplies the results of calculation to the laser drivers 32a to 32d and galvano-mirror driving circuits 39a to 39d.

As shown in FIG. 16, latches 44a to 44d which hold data of the results of calculation are provided in the galvano-mirror driving circuits 39a to 39d. If data is once written by the main control section 51, the value of the data is kept held until the data is next updated.

Data items latched in the latches 44a to 44d are converted into analog signals (voltages) by D/A converters 45a to 45d and input to drivers 46a to 46d which drive the galvano-mirrors 33a to 33d. The drivers 46a to 46d drive and control the galvano-mirrors 33a to 33d according to analog signals (voltages) input from the D/A converters 45a to 45d.

In this example, since only one of the amplified output signals of the sensor patterns SA to SG is selected by the selection circuit 41, integrated and A/D converted, the output signals of the sensor patterns SA to SG cannot be simultaneously input to the main control section 51.

Therefore, when the light beam power is sensed, it is necessary to move the light beam passage position onto the sensor pattern SA or SG and switch the state of the selection circuit 41 so as to input the output signal of the corresponding sensor pattern to the main control section 51.

In a case where the position which the light beam passes is not known, it is necessary to sequentially switch the state of the selection circuit 41, input the output signals of all of the sensor patterns SA to SG to the main control section 51 and determine the light beam passage position.

However, once the location which the light beam passes can be recognized, the light beam passage position can be estimated unless the galvano-mirrors 33a to 33d are excessively moved and it is not always necessary to input the output signals of all of the sensor patterns to the main control section 51.

Next, the schematic operation at the turn-ON time of the power supply of the printer section 2 is explained with reference to the flowchart of FIG. 17. In this case, the explanation of the operation of the scanner section 1 is omitted.

When the power supply of the copying machine is turned ON, the main control section 51 rotates the fixing roller in the fixing unit 26 and starts the heating control operation of the fixing unit 26 (S311, S312). Then, it executes the light beam power control routine to perform the control operation to make powers of the respective light beams on the photosensitive drum 15 uniform (S313).

After the control operation for making powers of the respective light beams on the photosensitive drum 15 uniform is performed, the offset correction routine is executed to detect an offset value of the light sensing device output processing circuit 40 and performs the process for correcting the offset value (S314). Next, the light beam passage position control routine is executed (S315).

After this, the routine of controlling the light beam position in the main scanning direction is executed (S316). Then, the photosensitive drum 15 is rotated and initialization processes associated with the process for making uniform the conditions such as the surface condition of the photosensitive drum 15, for example, are executed (S317).

After a series of initialization processes is performed, the fixing roller is kept rotated until the temperature of the fixing unit 26 is raised to a preset temperature and the standby state is set up (S318). When the temperature of the fixing unit 26 is raised to the preset temperature, the rotation of the fixing roller is interrupted (S319) and a copying command waiting state is set up (S320).

If a copying (printing) command is not received from the control panel 53 in the copying command waiting state (S320), the light beam power control routine is automatically executed (S322) when, for example, 30 minutes have passed (S321) after the light beam passage position control routine has been executed. Further, the offset correction routine is automatically executed (S323) and then the light beam passage position control routine and the routine of controlling the light beam position in the main scanning direction are executed again (S324, S325). After the above routines are terminated, the process is returned to the step S320 and the copying command waiting state is set up again.

If a copying command is received from the control panel 53 in the copying command waiting state (S320), whether or not a resolution changing command is issued is checked (S326). As the result of checking, if it is detected that the resolution changing command is issued, the rotation speed of the polygon motor 36 is switched to a value corresponding to the specified resolution (S327).

Next, one of the crystal oscillators 114a to 114d which corresponds to the specified resolution is selected (S328). Further, the light beam power control routine is executed (S329), the offset correction routine is executed (S330), then the light beam passage position control routine is executed (S331), the routine of controlling the light beam position in the main scanning direction is executed (S332) and the copying operation is performed (S333).

On the other hand, if it is detected as the result of checking in the step S326 that the resolution changing command is not issued, the rotation speed of the polygon motor 36 and the crystal oscillator are kept unchanged. Then, the light beam power control routine is executed (S329), the offset correction routine is executed (S330), the light beam passage position control routine is executed (S331), the routine of controlling the light beam position in the main scanning direction is executed (S332) and the copying operation is performed (S333).

After the copying operation is terminated, the process is returned to the step S320 and the above operation is repeated.

Thus, during the copying operation, the light beam power control routine, the light beam passage position control routine, and the routine of controlling the light beam position in the main scanning direction are executed and images are formed in an optimum state even in a case where a large number of successive copying operations are performed.

Figure 17:
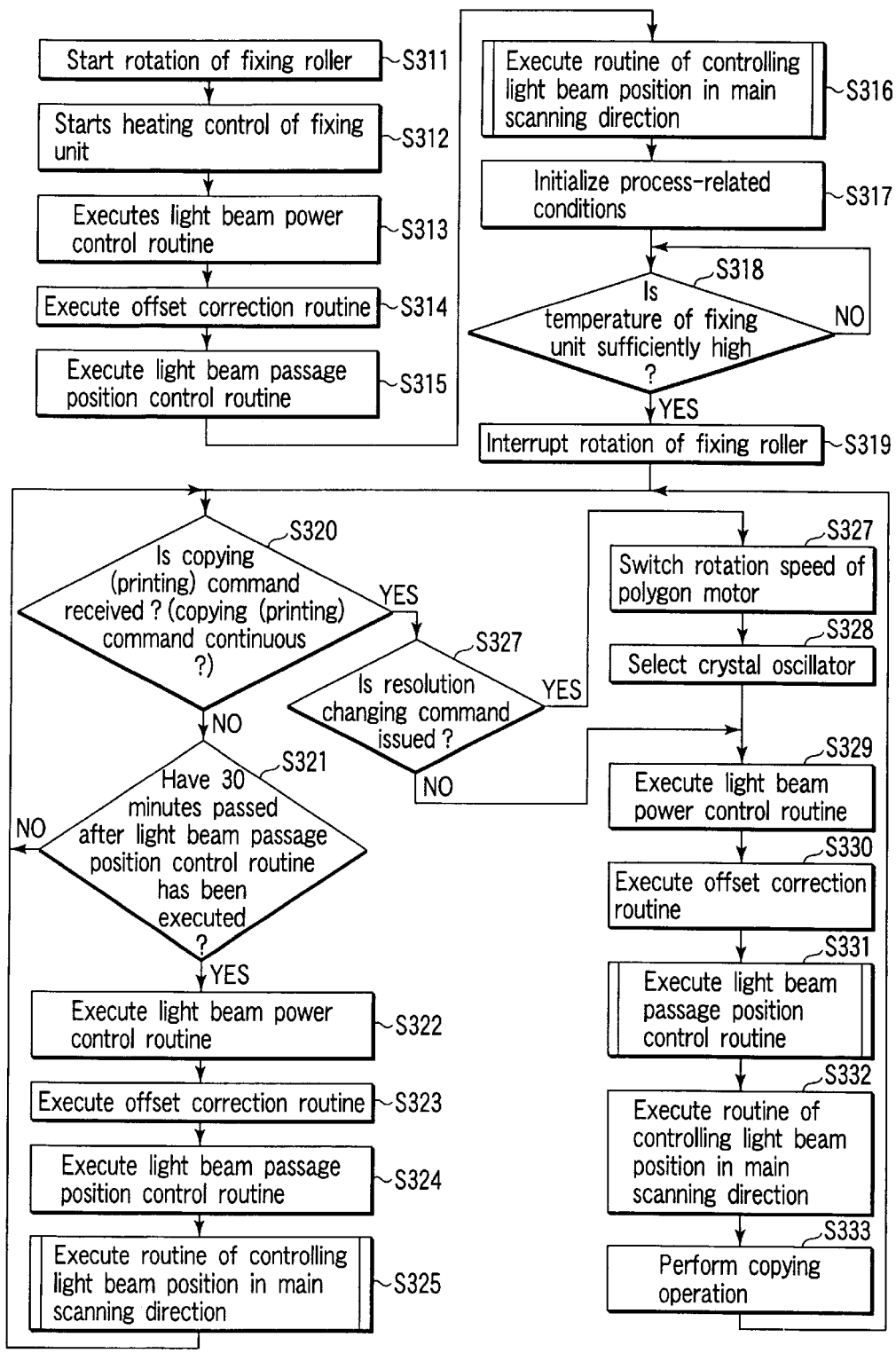
FIG. 17 is a flowchart for illustrating the schematic operation at the turn-on time of the power supply of a printer section.

Next, the routine of controlling the light beam position in the main scanning direction in the steps S316, S325, S332 of FIG. 17 is explained with reference to the flowchart shown in FIG. 18.

First, the main control section 51 acquires information of the light beam position in the main scanning direction of the light beam "a" (S341). In this case, information of the light beam position in the main scanning direction corresponds to selection information to the delay pulse selectors 118a to 118d and set values to the image transfer clock forming sections (printing area setting sections) 119a to 119d which cause the pattern S2 of the light sensing device 38 to come to the edge of the exposure area (printing area) as described before. The information acquiring method is explained in detail later.

Likewise, information items of the light beam positions in the main scanning direction of the light beams "b", "c", "d" are acquired (S342 to S344).

After information items of the light beam positions in the main scanning direction of the light beams "a" to "d" are thus acquired, the main control section 51 sets the printing area necessary for actual image formation (copying, printing) (S345). The printing area necessary for actual image formation (copying, printing) is set according to the information of the light beam positions in the main scanning direction of the light beams "a" to "d", the binding margin and the size of paper used for image formation (copying, printing) and the like.

For example, suppose that information as shown in FIG. 19 is acquired as the information of the light beam positions in the main scanning direction of the light beams "a" to "d". That is, the printing area (start to end) is set to "5 to 9" and the delay pulse is set to D5 for the light beam "a", the printing area (start to end) is set to "12 to 16" and the delay pulse is set to D8 for the light beam "b", the printing area (start to end) is set to "18 to 22" and the delay pulse is set to D2 for the light beam "c", and the printing area (start to end) is set to "20 to 24" and the delay pulse is set to D7 for the light beam "d".

If the size of paper used for actual image formation is A4-size, the paper is placed in the lateral direction and the binding margin is not set, then the printing area corresponds to 7015 ($\approx$297×600÷25.4) pixels when the resolution of 600 dpi is used.

In this case, if the distance between the sensor pattern S2 of the light sensing device 38 and the left end of the actual printing area is 100 pixels, the printing areas for the respective light beams are set as shown in FIG. 20. That is, the printing area (start to end) is set to "109 to 7124" for the light beam "a", the printing area (start to end) is set to "116 to 7131" for the light beam "b", the printing area (start to end) is set to "122 to 7137" for the light beam "c", and the printing area (start to end) is set to "124 to 7139" for the light beam "d".

If the delay pulses are set for the respective light beams "a" to "d" such that D5 is set for the light beam "a", D8 is set for the light beam "b", D2 is set for the light beam "c", and D7 is set for the light beam "d" after the printing areas are thus set, the printing areas for the respective light beams "a" to "d" coincide with one another with the precision of 1/10 pixel on the paper used for image formation.

Figure 18:
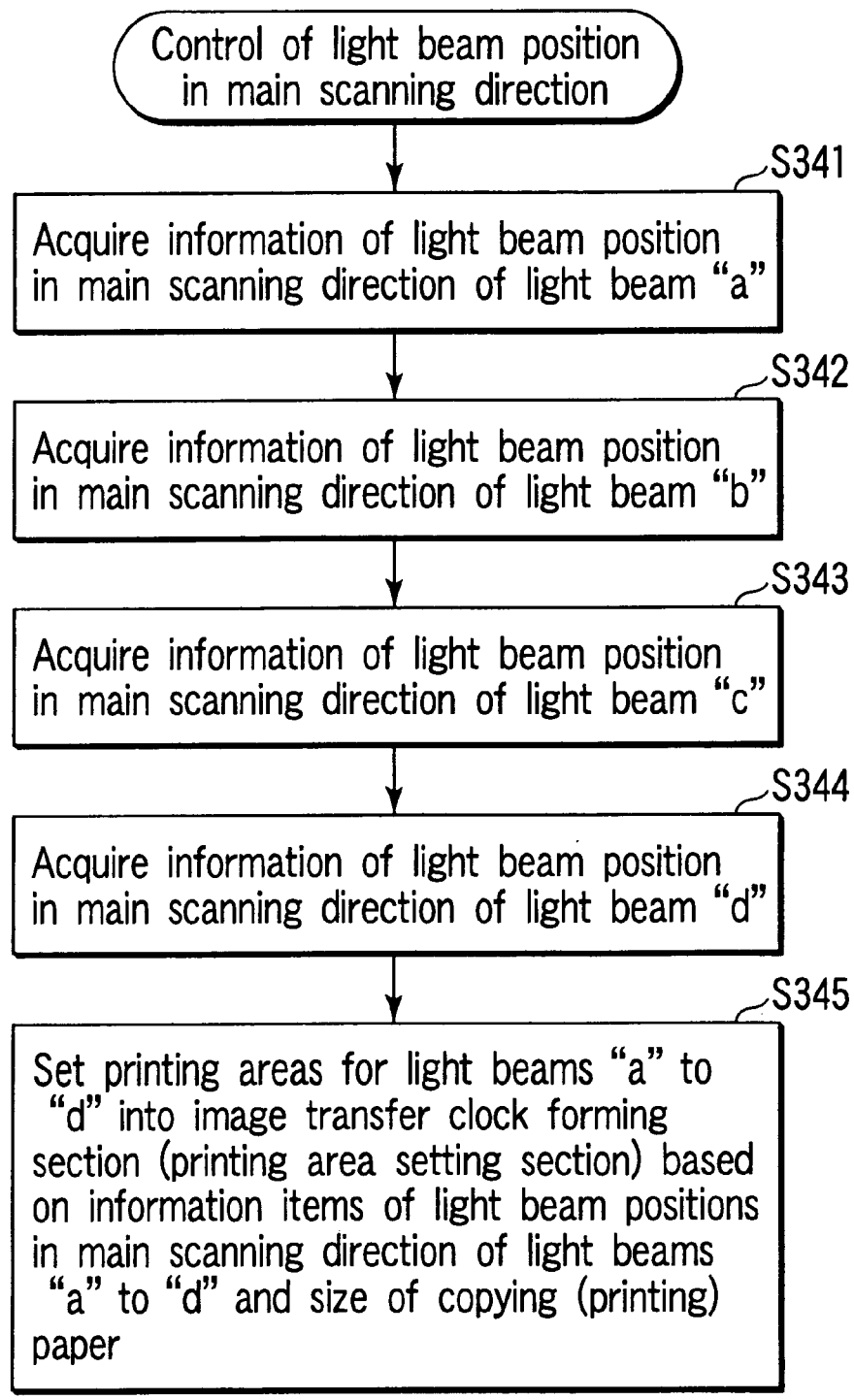
FIG. 18 is a flowchart for illustrating a control routine for the light beam position in the main scanning direction.
Figure 21:
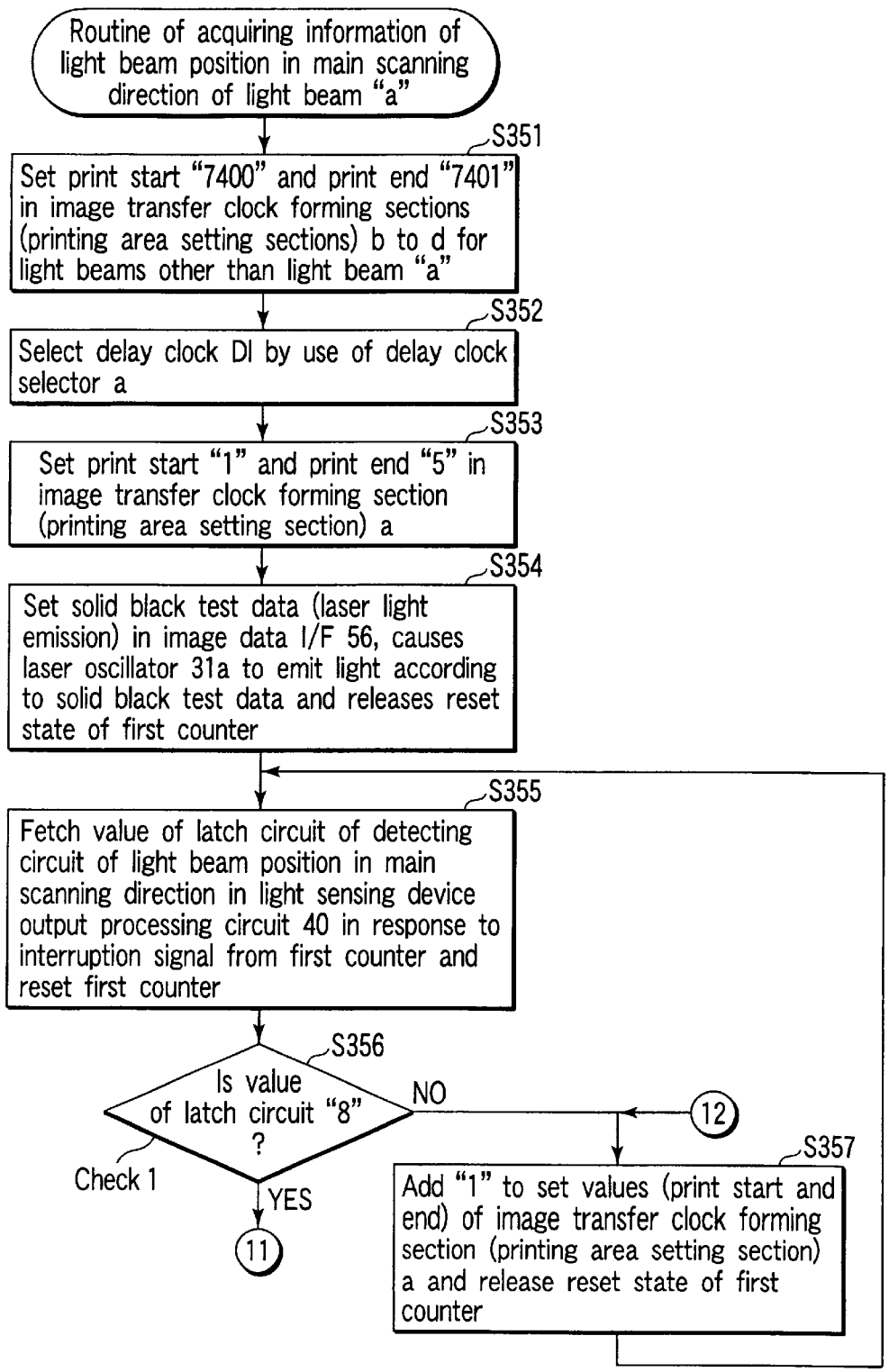
FIG. 21 is a flowchart for illustrating a routine of acquiring information of the light beam position in the main scanning direction.
Figure 22:
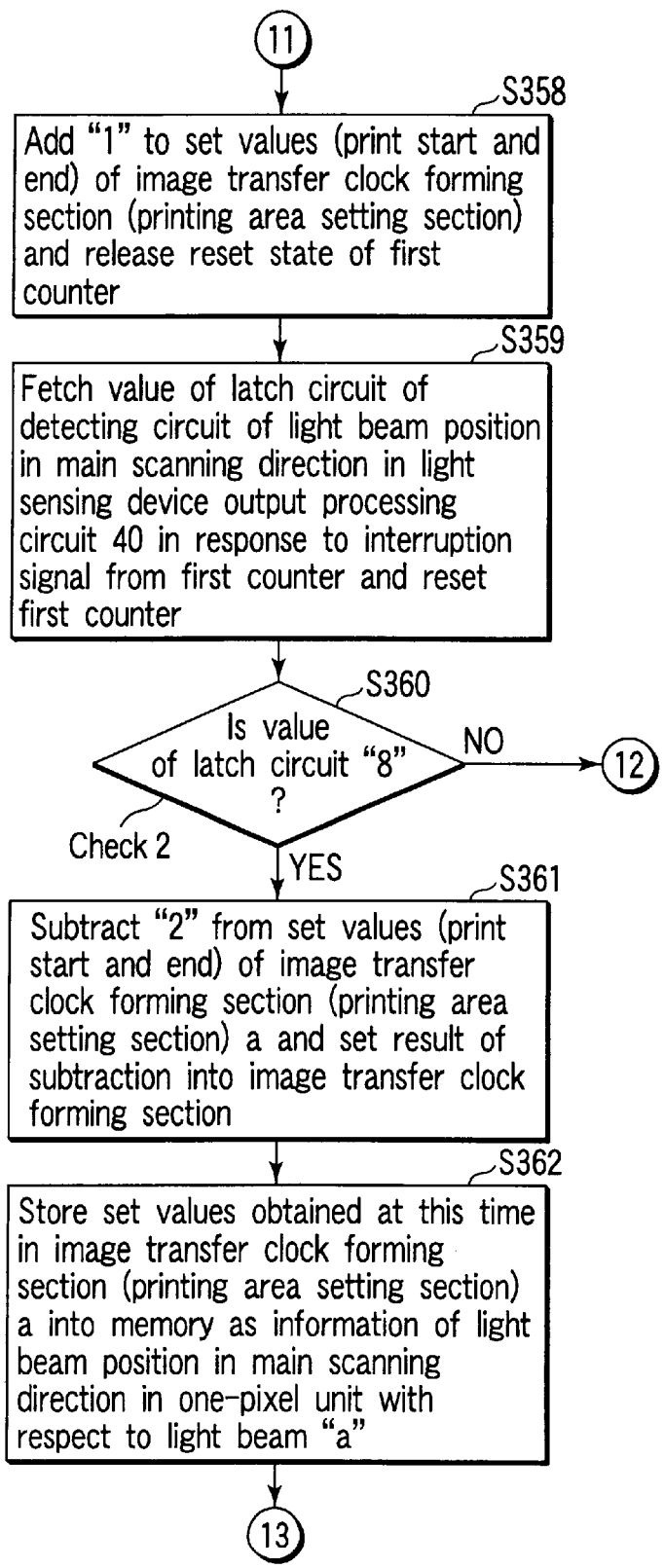
FIG. 22 is a flowchart for illustrating a routine of acquiring information of the light beam position in the main scanning direction.
Figure 23:
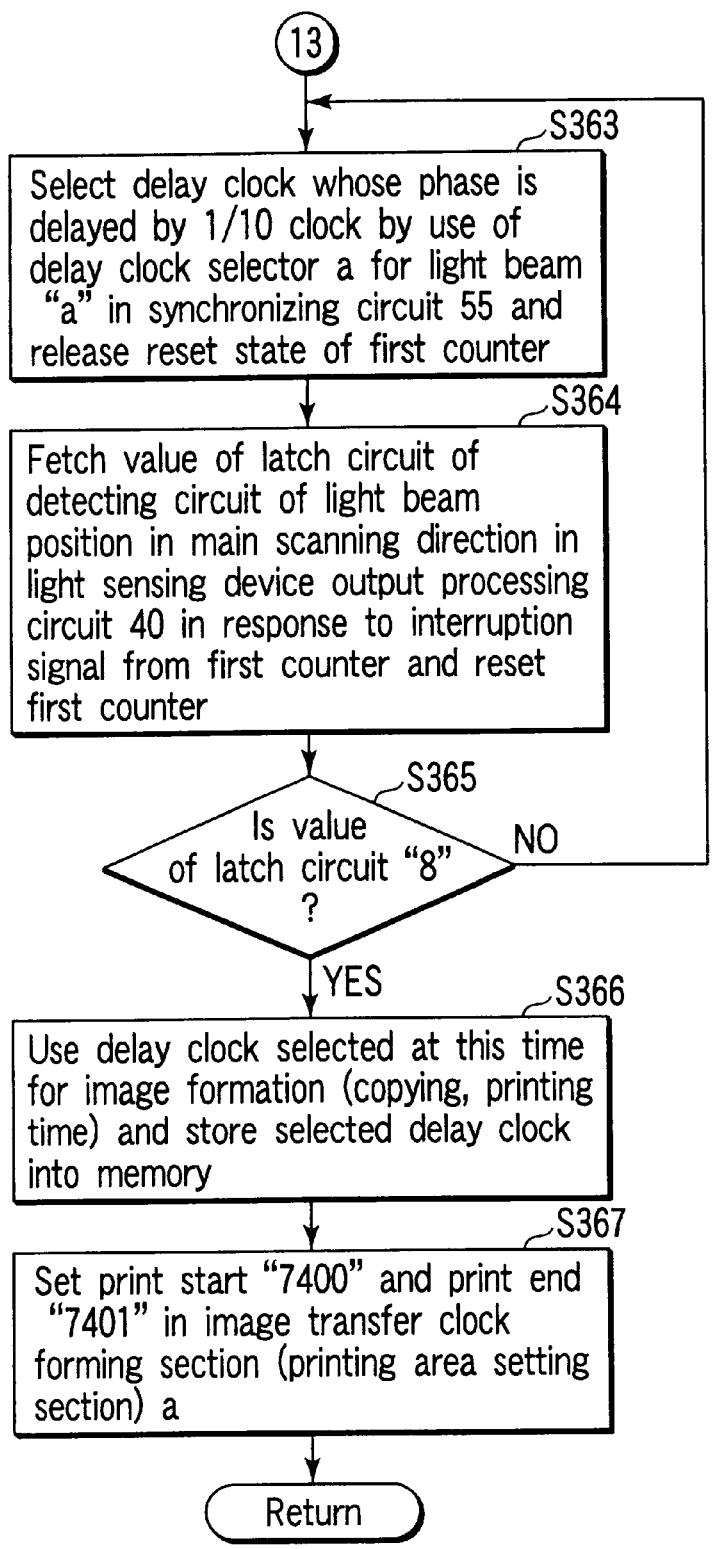
FIG. 23 is a flowchart for illustrating a routine of acquiring information of the light beam position in the main scanning direction.

FIGS. 21, 22, 23 are flowcharts for illustrating the routine of acquiring the information of the light beam position in the main scanning direction of the light beam "a" in the step S341 of FIG. 18. In this example, a case wherein the light beam "a" is used is explained, but this applies to the cases where the light beams "b" to "d" are used.

First, as the preparation process for acquiring information of the beam "a", the main control section 51 sets the print start "7400" and the print end "7401", for example, in the image transfer clock forming sections (printing area setting sections) 119b to 119d for the other light beams (S351). The step 351 is a step of setting the printing (exposure) areas by the light beams other than the light beam "a" apart from the light sensing device 38 and moving the same to a location in which the photosensitive drum 15 is not exposed. The step S351 is a necessary step of avoiding the interference between the light beams "a" to "d".

That is, in the step S351, the light beams "b" to "d" will not expose the sensor pattern S2 of the light sensing device 38 by setting the printing (exposure) areas of the light beams "b" to "d" to "7400 to 7401". Therefore, correct information relating only to the light beam "a" can be acquired.

Next, as the initialization process, the main control section 51 sets the state so that the delay pulse D1 will be used for image formation by use of the delay pulse selector 118a (S352). Then, the main control section 51 sets "1" as the print start position and "5" as the print end position in the image transfer clock forming section (printing area setting section) 119a (S353).

After this, the main control section 51 sets solid black test data in the image data I/F 56, causes the laser oscillator 31a to emit light according to the solid black test data and releases the reset signal for the first counter 111 (S354). As a result, the first counter 111 starts the operation. As described before, the printing area "1 to 5" (the area of five dots) of the light beam "a" is exposed by the above operation with the sensor pattern S1 of the light sensing device 38 used as a reference.

Next, the main control section 51 fetches data held in the latch circuit 113 in response to an interruption signal (counter carry signal) from the first counter 111, then resets the first counter 111 (S355) and determines whether the value is "8" or not (check 1, S356).

Since the sensor pattern S2 of the light sensing device 38 is not exposed if it is detected as the above determination result that the fetched data is not "8", "1" is added to the set values (print start and end) of the image transfer clock forming section (printing area setting section) 119a to shift the printing area (exposure area) by one pixel. After this, the reset state of the first counter 111 is released (S357) and the main control section 51 waits for an interruption signal from the first counter 111.

On the other hand, if it is detected as the result of determination in the step S356 that the fetched data is "8", it indicates the state in which the sensor pattern S2 of the light sensing device 38 is exposed. In this case, "1" is further added to the set values (print start and end) of the image transfer clock forming section (printing area setting section) 119a to shift the printing area (exposure area) by one pixel. After this, the reset state of the first counter 111 is released (S358).

Next, the main control section 51 fetches data held in the latch circuit 113 in response to an interruption signal (counter carry signal) from the first counter 111 (S359) and determines whether the value is "8" or not (check 2, S360).

If it is detected as the above determination result that the fetched data is not "8", the process is returned to the step S357 like the case of the process described before. After this, the first check process (check 1) is performed again.

On the other hand, if it is detected as the result of determination in the step S360 that the fetched data is "8", "2" is subtracted from the set values (print start and end) of the image transfer clock forming section (printing area setting section) 119a and the result of subtraction is set in the image transfer clock forming section (printing area setting section) 119a (S361). The values obtained at this time are stored into the memory 52 as information of the light beam position in the main scanning direction in the one-pixel unit for the light beam "a" (S362).

By the above operations, the main control section 51 shifts the printing area (exposure area) of five pixels in the one-pixel unit, can recognize the number of pixels by which the printing area (exposure area) is shifted to reach the sensor pattern S2 of the light sensing device 38 and store the value obtained immediately before reaching the sensor pattern into the memory 52.

In this example, the reason why the check 2 is performed is to correctly detect that the sensor pattern S2 of the light sensing device 38 responds to unnecessary spurious light which may occur in the optical unit and perform the correct control operation.

Generally, light energy of spurious light is extremely small in comparison with light energy of the original main light beam and the sensor pattern S2 of the light sensing device 38 will not make a response. However, the sensor pattern S2 may occasionally make a response for some reason. In order to eliminate such an incorrect response, it is only required to confirm that the sensor pattern S2 makes a response (senses light) even when the printing area (exposure area) is additionally shifted by an amount of several pixels after the sensor pattern S2 starts to make a response as explained in this example.

In the present example, for simplicity of the explanation, the printing area (exposure area) is configured by five pixels and the shift amount for confirmation is only one pixel, but the values are not limitative. The size of the printing area (exposure area) and the number of confirmation processes may be determined by taking the relation with respect to the size of the sensor pattern S2 of the light sensing device 38 into consideration.

If information of the light beam position in the main scanning direction of the light beam "a" in the one-pixel unit is thus acquired, the main control section 51 performs the operation to acquire information of the light beam position in the main scanning direction in the $\frac{1}{10}$-pixel unit.

At the present time (S362), the printing area (exposure area) is set immediately before the sensor pattern S2 of the light sensing device 38 makes a response by setting the printing area (exposure area) in the one-pixel unit in a state in which the delay pulse D1 is selected. In the present state, the main control section 51 switches the delay pulse from D1 to D2 (shifts the pulse position by $\frac{1}{10}$ clock), releases the reset state of the first counter 111 and waits for an interruption signal (S363).

When detecting the interruption signal from the first counter 111, the main control section 51 fetches a value of the latch circuit 113 of the circuit for detecting the light beam position in the main scanning direction in the light sensing device output processing circuit 40 and resets the first counter 111 (S364).

Next, the main control section 51 determines whether the value of the latch circuit 113 is "8" or not (S365) and checks whether or not the printing area (exposure area) reaches the sensor pattern S2 of the light sensing device 38.

As the result of checking, if it is detected that the value of the latch circuit is not "8", it is understood that the printing area (exposure area) does not yet reach the sensor pattern S2 of the light sensing device 38. Therefore, the process is returned to the step S363 and a delay pulse whose phase is shifted by $\frac{1}{10}$ clock is selected and the same determining operation as described above is performed.

As the result of checking in the step S365, if it is detected that the value of the latch circuit is "8", it is understood that the printing area (exposure area) has reached the sensor pattern S2. Therefore, the delay pulse obtained at this time is used for image formation (copying, printing) and the selected delay pulse is stored into the memory 52 (S366).

As described above, the main control section 51 can shift the printing area (exposure area) in approximately the $\frac{1}{10}$-pixel unit by setting the printing area (exposure area) and selecting the delay pulse. Further, by checking the response of the sensor pattern S2 of the light sensing device 38, information of the light beam position in the main scanning direction of the light beam "a" can be acquired with the precision of approximately $\frac{1}{10}$ pixel.

In the present embodiment, the operation for sequentially shifting the printing area (exposure area) towards the downstream side in the main scanning direction of the light beam and detecting a point at which the sensor pattern S2 of the light sensing device 38 makes a response is explained, but this invention is not limited to this method.

For example, the printing area (exposure area) is further sequentially shifted towards the downstream side in the main scanning direction of the light beam and a point at which the sensor pattern S2 of the light sensing device 38 comes to make no response is detected, and the point can be used as information of the light beam position in the main scanning direction of a corresponding one of the light beams "a" to "d".

Further, for example, the printing area (exposure area) is previously set on the downstream side in the main scanning direction of the light beam and sequentially shifted towards the upstream side and a point at which the sensor pattern S2 of the light sensing device 38 makes a response or comes to make no response may be detected.

Figure 24:
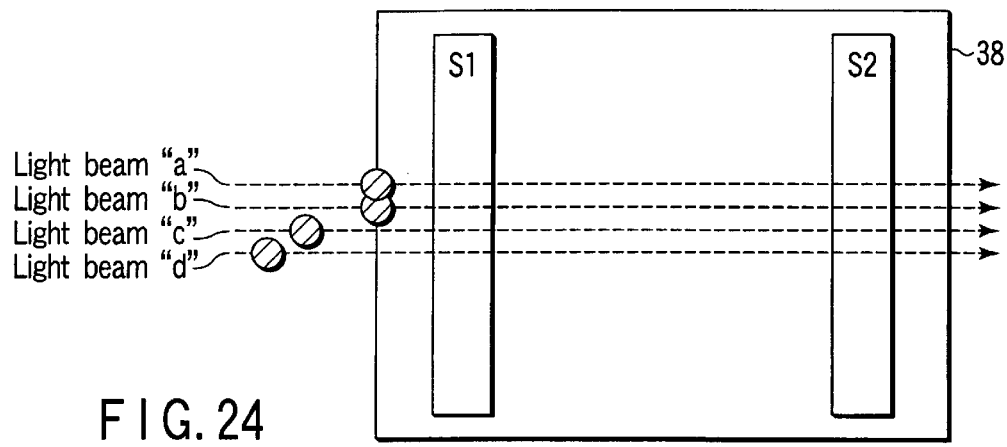
FIG. 24 is a view showing an example of the state of light beams.
Figure 25:
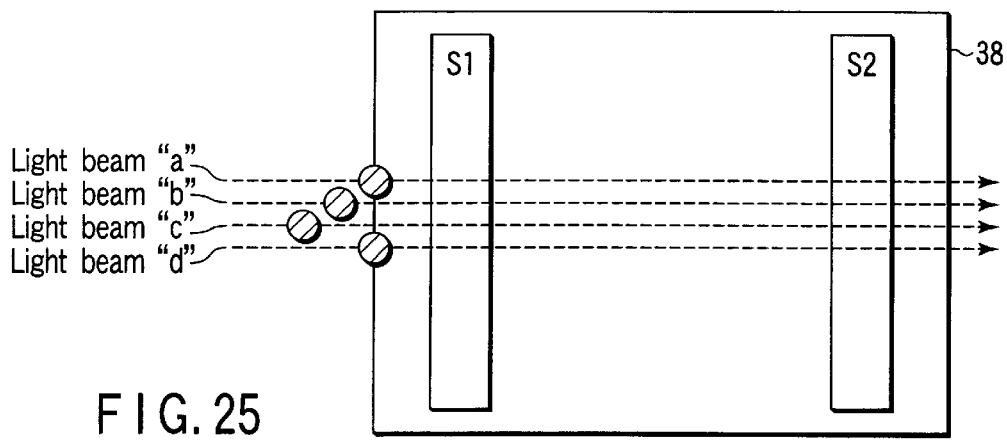
FIG. 25 is a view showing an example of the state of light beams.
Figure 26:
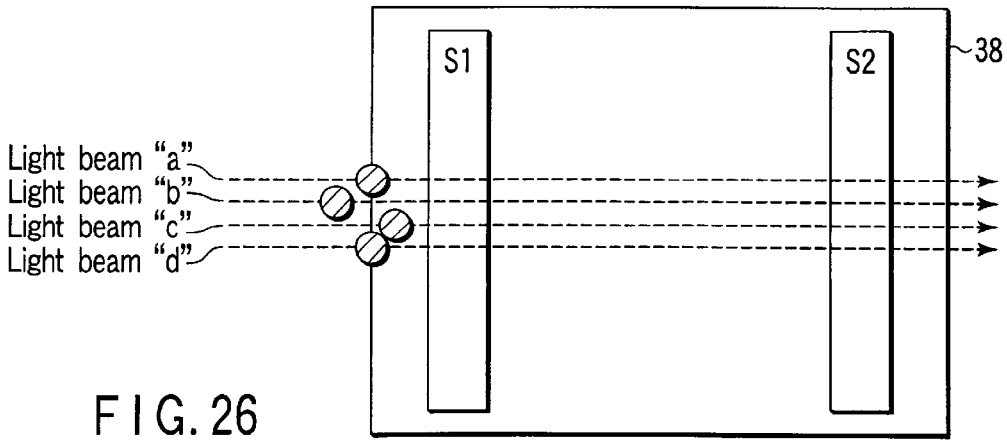
FIG. 26 is a view showing an example of the state of light beams.

As described in the beginning, no problem arises irrespective of the order of the light beams and the overlapped portions of the light beams. For example, in any one of the states shown in FIGS. 24, 25, 26 which are different from the state of the light beams used in the above explanation, the scanning range of the four light beams can be set to conform with one another.

Further, the number of light beams is not limited to a plurality of light beams. For example, even if only one light beam is used and when it is necessary to precisely form an image with respect to a reference position, the image forming range can be defined with a precision of submicron by using the method explained so far.

As described above, according to the embodiment of this invention, a light beam scanning apparatus and image forming apparatus which can enhance the reliability and always correctly control the exposure position in the scanning direction (main scanning direction) of the light beam can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus comprising:
   light emitting means for emitting a light beam,
   scanning means for reflecting the light beam emitted from the light emitting means to a to-be-scanned surface to scan the to-be-scanned surface by use of the light beam,
   light sensing means arranged on the to-be-scanned surface or in an equivalent position thereof, for sensing the light beam which is used to scan the to-be-scanned surface by the scanning means,
   sync signal output means for delaying an output of the light sensing means by a delay amount which is controllable,
   image forming range setting means for setting an image forming range of the light beam while the sync signal output from the sync signal output means is used as a reference, and
   control means for controlling the sync signal output means and image forming range setting means to set the image forming range of the light beam to a preset position.

2. The light beam scanning apparatus according to claim 1, wherein the sync signal output means includes a delay line which outputs the output of the light sensing means as a plurality of signals having different delay amounts and a selector which selects one of the plurality of outputs.

3. The light beam scanning apparatus according to claim 1, wherein the image forming range setting means includes a clock synchronizing circuit which outputs a clock synchronized with the sync signal output from the sync signal output means and sets an image forming range with the clock output from the clock synchronizing circuit used as a reference.

4. The light beam scanning apparatus according to claim 1, which further comprises second light sensing means arranged on the downstream side in the light beam scanning direction with respect to the light sensing means, for sensing the light beam which is used to scan the to-be-scanned surface by the scanning means and in which the control means controls the sync signal output means and image forming range setting means to set the image forming range of the light beam to a preset position based on a sensing output from the second light sensing means.

5. The light beam scanning apparatus according to claim 1, which further comprises second light sensing means arranged on the downstream side in the light beam scanning direction with respect to the light sensing means, for sensing the light beam which is used to scan the to-be-scanned surface by the scanning means, and counting means for counting the number of times by which the second light sensing means has sensed the light beam and in which the control means causes the light beam to scan by a preset number of times in an image forming range set by the sync signal output means and image forming range setting means and controls the sync signal output means and image forming range setting means to set the image forming range of the light beam to a preset position based on the number of times counted by the counting means.

6. The light beam scanning apparatus according to claim 5, wherein the scanning means has a plurality of reflection surfaces and the number of scanning times is not less than the number of reflection surfaces.

7. A light beam scanning apparatus comprising:
   first light emitting means for emitting a first light beam,
   second light emitting means for emitting a second light beam,
   scanning means for reflecting one of the first and second light beams emitted from the first and second light emitting means to a to-be-scanned surface to scan the to-be-scanned surface by use of one of the first and second light beams,
   first light sensing means arranged on the to-be-scanned surface or in an equivalent position thereof, for sensing one of the first or second light beams which is used to scan the to-be-scanned surface by the scanning means,
   second light sensing means arranged on the downstream side in the light beam scanning direction with respect to the first light sensing means, for sensing one of the first and second light beams which is used to scan the to-be-scanned surface by the scanning means,
   first sync signal output means for delaying an output of the first light sensing means and outputting a first sync signal having a delay amount which is controllable,
   first image forming range setting means for setting an image forming range of the first light beam while the first sync signal output from the first sync signal output means is used as a reference,
   second sync signal output means for delaying an output of the first light sensing means and outputting a second sync signal having a delay amount which is controllable,
   second image forming range setting means for setting an image forming range of the second light beam while the second sync signal output from the second sync signal output means is used as a reference, control means for controlling the first and second sync signal output means and first and second image forming range setting means to make the image forming ranges of the first and second light beams coincide with each other on the to-be-scanned surface based on sensing outputs of the first and second light beams from the second light sensing means.

8. The light beam scanning apparatus according to claim 7, wherein each of the first and second sync signal output means includes a delay line which outputs the output of the first light sensing means as a plurality of signals having different delay amounts, a first selector which selects one of the plurality of signals which corresponds to the first light beam, and a second selector which selects one of the plurality of signals which corresponds to the second light beam.

9. The light beam scanning apparatus according to claim 7, wherein the first image forming range setting means includes a first clock synchronizing circuit which outputs a clock synchronized with the first sync signal output from the first sync signal output means and sets an image forming range with the clock output from the first clock synchronizing circuit used as a reference.

10. The light beam scanning apparatus according to claim 7, wherein the second image forming range setting means includes a second clock synchronizing circuit which outputs a clock synchronized with the second sync signal output from the second sync signal output means and sets an image forming range with the clock output from the second clock synchronizing circuit used as a reference.

11. The light beam scanning apparatus according to claim 7, which further comprises counting means for counting the number of times by which the second light sensing means has sensed one of the first and second light beams and in which the control means causes the first light beam to scan by a preset number of times in an image forming range set by the first sync signal output means and first image forming range setting means and controls the first sync signal output means and first image forming range setting means based on the number of times counted by the counting means, causes the second light beam to scan by a preset number of times in an image forming range set by the second sync signal output means and second image forming range setting means and controls the second sync signal output means and second image forming range setting means based on the number of times counted by the counting means, and makes the image forming ranges of the first and second light beams coincide with each other on the to-be-scanned surface.

12. The light beam scanning apparatus according to claim 11, wherein the scanning means has a plurality of reflection surfaces and the number of scanning times is not less than the number of reflection surfaces.

13. The light beam scanning apparatus according to claim 7, wherein the control means has:
a step of setting a delay amount into the first sync signal output means,
a step of setting an image forming range into the first image forming range setting means,
a step of scanning the first light beam in the image forming range set by the first sync signal output means and first image forming range setting means,
a step of setting a delay amount into the second sync signal output means,
a step of setting an image forming range into the second image forming range setting means, and
a step of scanning the second light beam in the image forming range set by the second sync signal output means and second image forming range setting means.

14. An image forming apparatus which scans and exposes an image carrying body by use of a light beam to form an image on the image carrying body, comprising:
light emitting means for emitting a light beam,
scanning means for reflecting the light beam emitted from the light emitting means to the image carrying body to scan the image carrying body by use of the light beam,
light sensing means arranged on the image carrying body or in an equivalent position thereof, for sensing the light beam which is used to scan the image carrying body by the scanning means,
sync signal output means for delaying an output of the light sensing means by a delay amount which is controllable,
image forming range setting means for setting an image forming range of the light beam while the sync signal output from the sync signal output means is used as a reference, and
control means for controlling the sync signal output means and image forming range setting means to set the image forming range of the light beam to a preset position.

15. The image forming apparatus according to claim 14, wherein the sync signal output means includes a delay line which outputs the output of the light sensing means as a plurality of signals having different delay amounts and a selector which selects one of the plurality of outputs.

16. The image forming apparatus according to claim 14, wherein the image forming range setting means includes a clock synchronizing circuit which outputs a clock synchronized with the sync signal output from the sync signal output means and sets an image forming range with the clock output from the clock synchronizing circuit used as a reference.

17. The image forming apparatus according to claim 14, which further comprises second light sensing means arranged on the downstream side in the light beam scanning direction with respect to the light sensing means, for sensing the light beam which is used to scan the to-be-scanned surface by the scanning means and in which the control means controls the sync signal output means and image forming range setting means based on a sensing output from the second light sensing means.

18. The image forming apparatus according to claim 14, which further comprises second light sensing means arranged on the downstream side in the light beam scanning direction with respect to the light sensing means, for sensing the light beam which is used to scan the to-be-scanned surface by the scanning means, and counting means for counting the number of times by which the second light sensing means has sensed the light beam and in which the control means causes the light beam to scan by a preset number of times in an image forming range set by the sync signal output means and image forming range setting means and controls the sync signal output means and image forming range setting means to set the image forming range of the light beam to a preset position based on the number of times counted by the counting means.

19. The image forming apparatus according to claim 18, wherein the scanning means has a plurality of reflection surfaces and the number of scanning times is not less than the number of reflection surfaces.

* * * * *